US012785207B2

(12) United States Patent
Ke et al.

(10) Patent No.: US 12,785,207 B2
(45) Date of Patent: Nov. 3, 2026

(54) END COVER ASSEMBLY, BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Haibo Ke, Ningde (CN); Quankun Li, Ningde (CN); Peng Wang, Ningde (CN); Chengyou Xing, Ningde (CN); Ningsheng Wu, Ningde (CN); Kaihuan Yang, Ningde (CN); Xiang Mei, Ningde (CN); Lili Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 549 days.

(21) Appl. No.: 18/228,372

(22) Filed: Jul. 31, 2023

(65) Prior Publication Data

US 2023/0395931 A1 Dec. 7, 2023

Related U.S. Application Data

(63) Continuation of application No. PCT/CN2021/128195, filed on Nov. 2, 2021.

(51) Int. Cl.
*H01M 2/12* (2006.01)
*H01M 50/15* (2021.01)
(Continued)

(52) U.S. Cl.
CPC ....... *H01M 50/3425* (2021.01); *H01M 50/15* (2021.01); *H01M 50/159* (2021.01);
(Continued)

(58) Field of Classification Search
CPC ............ H01M 50/3425; H01M 50/35; H01M 50/317; H01M 50/375; H01M 50/186;
(Continued)

(56) References Cited

U.S. PATENT DOCUMENTS

2007/0212595 A1 9/2007 Kim et al.
2015/0333300 A1 11/2015 Kim
(Continued)

FOREIGN PATENT DOCUMENTS

CN 101009365 A 8/2007
CN 101901886 A 12/2010
(Continued)

OTHER PUBLICATIONS

The World Intellectual Property Organization (WIPO) International Search Report for PCT/CN2021/128195 Aug. 3, 2022 5 pages (English translation included).
(Continued)

*Primary Examiner* — Raymond Alejandro
(74) *Attorney, Agent, or Firm* — ANOVA LAW GROUP, PLLC

(57) ABSTRACT

An end cover assembly includes an end cover and a pressure relief member. The pressure relief member is provided in the end cover, and the pressure relief member is provided with an indentation groove. The pressure relief member is configured to crack along the indentation groove to release internal pressure of a battery cell when internal pressure or temperature of the battery cell reaches a threshold. Hardness of the pressure relief member is lower than hardness of the end cover.

19 Claims, 7 Drawing Sheets

(51) Int. Cl.

| | |
|---|---|
| ***H01M 50/159*** | (2021.01) |
| ***H01M 50/186*** | (2021.01) |
| ***H01M 50/342*** | (2021.01) |
| ***H01M 50/588*** | (2021.01) |
| ***H01M 50/59*** | (2021.01) |

(52) U.S. Cl.
CPC ....... *H01M 50/186* (2021.01); *H01M 50/588* (2021.01); *H01M 50/59* (2021.01); *H01M 2200/20* (2013.01)

(58) Field of Classification Search
CPC .. H01M 50/59; H01M 50/159; H01M 50/588; H01M 50/15; H01M 2200/20; H01M 2200/10
See application file for complete search history.

(56) References Cited

U.S. PATENT DOCUMENTS

| | | | | |
|---|---|---|---|---|
| 2017/0207439 | A1 | 7/2017 | Park et al. | |
| 2019/0115163 | A1 | 4/2019 | Yamashita et al. | |
| 2022/0123417 | A1* | 4/2022 | Huang ................ | H01M 50/271 |

FOREIGN PATENT DOCUMENTS

| | | | | |
|---|---|---|---|---|
| CN | 202004055 | U | † | 10/2011 |
| CN | 110429214 | A | | 11/2019 |
| CN | 112103414 | A | | 12/2020 |
| CN | 209880668 | U | † | 12/2020 |
| JP | 2010277785 | A | † | 12/2010 |
| KR | 1020190104688 | A | | 9/2019 |
| WO | 2021184504 | A1 | | 9/2021 |

OTHER PUBLICATIONS

The European Patent Office (EPO) The Extended European Search Report for Application No. 21962789.0 Jul. 18, 2024 9 Pages.

China National Intellectual Property Administration (CNIPA) The First Office Action for Application No. 202180092953.3 Apr. 3, 2026 24 Pages (including translation).

State Intellectual Property Office of China Notice of Grant of Invention Patent Right for Application No. 202180092953.Jul. 3, 02, 2026 6 pages (including translation).

Yang Liu et al., "Research of Thermal Runaway and Internal Evolution Mechanism of Lithium Iron Phosphate Energy Storage Battery", High Voltage Engineering, 47.4 (2021): 1333-1343.

* cited by examiner
† cited by third party

END COVER ASSEMBLY, BATTERY CELL, BATTERY, AND ELECTRIC APPARATUS

CROSS-REFERENCE TO RELATED APPLICATION

This application is a continuation of International Application No. PCT/CN2021/128195, filed Nov. 2, 2021, the entire content of which is incorporated herein by reference.

TECHNICAL FIELD

This application relates to the field of battery technologies, and specifically to an end cover assembly, a battery cell, a battery, and an electric apparatus.

BACKGROUND

With outstanding advantages such as high energy density, low environmental pollution, high power density, long service life, wide application range, and small self-discharge coefficient, lithium-ion batteries have been one of the most widely used battery types in the world and an important part of new energy development. With the continuous development of lithium-ion battery technology, higher requirements have been placed on the safety performance of lithium-ion batteries. Pressure relief members on lithium-ion batteries have an important effect on the safety performance of lithium-ion batteries. However, when a lithium-ion battery experiences a short circuit or overcharging, it is highly likely to cause internal thermal runaway, which in turn leads to a sudden increase in internal pressure, posing significant safety hazards for the lithium-ion battery.

SUMMARY

Embodiments of this application provide an end cover assembly, a battery cell, a battery, and an electric apparatus, which can effectively reduce safety risks of batteries during use.

According to a first aspect, an embodiment of this application provides an end cover assembly for a battery cell, where the end cover assembly includes an end cover and a pressure relief member; and the pressure relief member is disposed on the end cover, the pressure relief member is provided with an indentation groove, and the pressure relief member is configured to crack along the indentation groove to release internal pressure of the battery cell when internal pressure or temperature of the battery cell reaches a threshold, where hardness of the pressure relief member is lower than hardness of the end cover.

In the above technical solution, the pressure relief member is installed on the end cover of the end cover assembly to relieve pressure inside the battery cell, and the hardness of the pressure relief member is designed to be less than the hardness of the end cover. Such structure facilitates provision of the indentation groove on the pressure relief member, and is conducive to ensuring the processing accuracy of the indentation groove, so that when internal pressure or temperature of the battery cell reaches the threshold, the pressure relief member can crack along the indentation groove to relieve pressure inside the battery cell, reducing the risk of fire or explosion during use of the battery cell. In addition, while ensuring the hardness of the end cover, this is also convenient for the gas inside the battery cell to blow open the indentation groove of the pressure relief member, with no need to make the depth of the indentation groove too deep. This allows for a thicker bottom wall of the indentation groove to enhance the anti-deformation capability of the pressure relief member, thereby effectively reducing the occurrence of impaired shock resistance of the pressure relief member caused by the deformation of the groove bottom wall of the indentation groove under external force. Thus, the pressure relief member can crack along the indentation groove only when internal pressure or temperature of the battery cell reaches the threshold, thus helping ensure the stable relief pressure of the pressure relief member. In addition, because the hardness of the end cover is greater than the hardness of the pressure relief member, when internal pressure in the battery cell increases, the gas inside the battery cell will first cause the pressure relief member with lower hardness to crack, so that the pressure relief member can implement the pressure relief function, thus facilitating the controllable exhaust direction of the battery cell.

In some embodiments, the melting point of the pressure relief member is lower than the melting point of the end cover.

In the above technical solution, the melting point of the end cover is designed to be higher than the melting point of the pressure relief member, so that the end cover can withstand higher temperature than the pressure relief member in the case of thermal runaway in the battery cell. This can effectively reduce the occurrence of premature melting of the end cover, so that the gas inside the battery cell can be stably relieved through the pressure relief member, thereby effectively reducing the risk of fire and explosion in the battery cell.

In some embodiments, the melting point of the end cover is higher than 1,000 degrees Celsius.

In the above technical solution, the melting point of the end cover is set to be higher than 1,000 degrees Celsius, so that the end cover can withstand most of the high temperature environments during use, effectively reducing the occurrence of premature melting of the end cover and facilitating the use safety of the battery cell.

In some embodiments, a material of the end cover includes steel.

In the above technical solution, the end cover made of steel has a higher hardness and melting point, which is beneficial to improve the structural strength and high-temperature resistance of the end cover, thereby effectively reducing the occurrence of premature melting of the end cover and playing a good explosion-proof role. In addition, the end cover of this material has lower cost and is easy to process and manufacture.

In some embodiments, a material of the pressure relief member includes aluminum.

In the above technical solution, a pressure relief member made of softer aluminum material facilitates provision of the indentation groove on the pressure relief member, with lower cost, and also allows the gas inside the battery cell to blow open the pressure relief member, thus achieving a good pressure relief effect.

In some embodiments, the end cover assembly further includes a connecting member and a restraint member. The connecting member is attached to the end cover, and the connecting member is provided with a pressure relief hole. The pressure relief hole is configured to communicate with the interior of the battery cell. The pressure relief member covers the pressure relief hole. The restraint member is attached to the connecting member. In a thickness direction of the end cover, the restraint member and the connecting member are configured to clamp a portion of the pressure relief member.

In the above technical solution, the end cover assembly is provided with a connecting member and a restraint member, the connecting member is attached to the end cover, and the restraint member is connected to the connecting member, so that the restraint member and the connecting member can cooperate to clamp a portion of the pressure relief member. With this structure, the pressure relief member can be mounted on the end cover made of a different material. In addition, the connecting member is provided with the pressure relief hole for communication with the interior of the battery cell, and the pressure relief member covers the pressure relief hole, so that the pressure relief member can meet the pressure relief requirements of the battery cell.

In some embodiments, the connecting member includes a first connecting part and a second connecting part; the first connecting part is attached to the end cover, and the pressure relief hole is provided in the first connecting part; the second connecting part is provided around an edge of the first connecting part; the restraint member and the pressure relief member are both located on an inner peripheral side of the second connecting part, the restraint member is attached to the second connecting part, and in the thickness direction of the end cover, the restraint member and the first connecting part are configured to clamp a portion of the pressure relief member.

In the above technical solution, the connecting member is provided with the first connecting part and the second connecting part. The first connecting part is attached to the end cover, and the second connecting part is disposed around the outer side of the first connecting part, so that the restraint member and the pressure relief member can be disposed on the inner peripheral side of the second connecting part. The restraint member is connected to the second connecting part, so that the restraint member can cooperate with the first connecting part to clamp the pressure relief member to fasten the pressure relief member. The connecting member with this structure is advantageous in improving the structural stability of the end cover assembly, and facilitates the assembling of the end cover assembly.

In some embodiments, the end cover is provided with a positioning hole running through inner and outer surfaces of the end cover; and at least part of the first connecting part is inserted in the positioning hole.

In the above technical solution, the positioning hole is provided in the end cover so that at least part of the first connecting part can be inserted into the positioning hole to position and restrain the connecting member, thereby improving the installation accuracy between the connecting member and the end cover.

In some embodiments, the restraint member is an annular structure extending in a circumferential direction of the pressure relief member.

In the above technical solution, the restraint member is provided as an annular structure extending in the circumferential direction of the pressure relief member, so that the restraint member can cooperate with the connecting member to clamp the pressure relief member in the circumferential direction, allowing the pressure relief member to be stably mounted on the end cover.

In some embodiments, the restraint member is located on an outer peripheral side of the indentation groove.

In the above technical solution, with the restraint member being disposed on the outer peripheral side of the indentation groove of the pressure relief member, the restraint member can effectively avoid the position of the indentation groove of the pressure relief member when clamping the pressure relief member in cooperation with the connecting member. This ensures that the restraint member does not affect the pressure relief member's cracking along the indentation groove when internal pressure or temperature of the battery cell reaches the threshold.

In some embodiments, the connecting member and the end cover are made of a same material, and the connecting member is welded to the end cover.

In the above technical solution, the connecting member and the end cover are made of the same material, so that the connecting member can be welded to the end cover to effectively improve the connection strength between the connecting member and the end cover, thereby improving the structural strength of the end cover assembly.

In some embodiments, the restraint member and the connecting member are made of a same material, and the restraint member is welded to the connecting member.

In the above technical solution, the restraint member and the connecting member are made of the same material, so that the restraint member can be welded to the connecting member to effectively improve the connection strength between the restraint member and the connecting member, thereby improving the structural strength of the end cover assembly.

In some embodiments, the end cover assembly further includes a seal; at least part of the seal is located between the connecting member and the pressure relief member in the thickness direction of the end cover, and the seal is configured to seal the connecting member and the pressure relief member.

In the above technical solution, the seal is provided between the connecting member and the pressure relief member, so that the seal can fill the gap between the connecting member and the pressure relief member to reduce the leakage of gas from inside the battery cell through the gap between the connecting member and the pressure relief member, thus reducing the possibility of the failure of the pressure relief member and improving the safety of the battery cell having this end cover assembly.

In some embodiments, the connecting member has an abutting surface for the seal to abut against in the thickness direction of the end cover; and the abutting surface is provided with a restraint projection, the restraint projection being an annular structure extending in a circumferential direction of the pressure relief hole, and the seal fitting around an outer peripheral surface of the restraint projection.

In the above technical solution, the connecting member is provided with the abutting surface for the seal to abut against, so that the seal is located between the abutting surface and the pressure relief member. The abutting surface is provided with a restraint projection extending in the circumferential direction of the pressure relief hole. The seal is fitted around the outer peripheral surface of the restraint projection, so that the restraint projection can provide certain restraint for the seal, thereby restricting movement of the seal between the connecting member and the pressure relief member and improving the sealing effect of the seal on the connecting member and the pressure relief member.

In some embodiments, the end cover assembly further includes an insulating member; and in the thickness direction of the end cover, at least part of the insulating member is located between the pressure relief member and the restraint member to insulate the pressure relief member from the restraint member.

In the above technical solution, the end cover assembly is further provided with the insulating member, and at least part of the insulating member is disposed between the pressure relief member and the restraint member, to insulate the pressure relief member from the restraint member. In other words, the insulating member enables electrical insulation between the pressure relief member and the restraint member, to reduce the occurrence of electrical conduction between the pressure relief member and the restraint member, thus helping improve the service life of the pressure relief member and the safety of using the battery cell having such end cover assembly.

In some embodiments, the insulating member includes a first insulator; in the thickness direction of the end cover, the restraint member is provided with a first restraint slot on a side facing the pressure relief member; and the first restraint slot is configured to accommodate at least part of the first insulator to restrict movement of the insulating member in the predetermined direction, the predetermined direction being perpendicular to the thickness direction of the end cover.

In the above technical solution, the first restraint slot is provided on the side of the restraint member facing the pressure relief member, so that at least part of the first insulator of the insulating member can be accommodated in the first restraint slot, effectively restricting the movement of the insulating member along the predetermined direction perpendicular to the thickness direction of the end cover. This reduces the occurrence of the insulating member detaching from between the pressure relief member and the restraint member, and allows the insulating member to better insulate the pressure relief member from the restraint member.

In some embodiments, in the thickness direction of the end cover, the first insulator is provided with a second restraint slot on a side facing the pressure relief member, where the second restraint slot is configured to accommodate part of the pressure relief member to restrict movement of the pressure relief member in the predetermined direction.

In the above technical solution, the second restraint slot is provided on the side of the first insulator facing the pressure relief member, so that the second restraint slot can be configured to accommodate a portion of the pressure relief member. In this way, when the gas inside the battery cell arches the pressure relief member, the pressure relief member can be effectively restricted from moving in the predetermined direction, thereby reducing the occurrence of large gaps between the pressure relief member and the connecting member caused by misplacement, improving the installation stability of the pressure relief member, and reducing the leakage of gas inside the battery cell.

In some embodiments, the insulating member further includes a second insulator, where the second insulator is convexly disposed on an inner peripheral surface of the first insulator and is disposed between the restraint member and the pressure relief member in the thickness direction of the end cover.

In the above technical solution, the insulating member is further provided with the second insulator. The second insulator is convexly provided on the inner peripheral surface of the first insulator, and is disposed between the restraint member and the pressure relief member in the thickness direction of the end cover to separate the pressure relief member from the side wall of the first restraint slot, allowing the insulating member to better insulate the pressure relief member from the restraint member.

In some embodiments, in the thickness direction of the end cover, the restraint member is provided with a first restraint slot on a side facing the pressure relief member, where the first restraint slot is configured to accommodate a portion of the pressure relief member to restrict movement of the pressure relief member in a predetermined direction, the predetermined direction being perpendicular to the thickness direction of the end cover.

In the above technical solution, the first restraint slot is provided on the side of the restraint member facing the pressure relief member, so that the first restraint slot can accommodate a portion of the pressure relief member. In this way, when the gas inside the battery cell arches the pressure relief member, the pressure relief member can be effectively restricted from moving in the predetermined direction, thereby reducing the occurrence of large gaps between the pressure relief member and the connecting member caused by misplacement, improving the installation stability of the pressure relief member, and reducing the leakage of gas inside the battery cell.

In some embodiments, the pressure relief member includes a pressure relief part and a fastening part; the pressure relief part is provided with the indentation groove, and the pressure relief part is configured to crack along the indentation groove to release internal pressure of the battery cell when internal pressure or temperature of the battery cell reaches a threshold; the fastening part is located on an outer peripheral side of the pressure relief part in the predetermined direction, at least part of the fastening part being accommodated in the first restraint slot; and an outer surface of the fastening part is closer to the outside of the battery cell than an outer surface of the pressure relief part in the thickness direction of the end cover, and a stepped surface is formed between the outer surface of the fastening part and the outer surface of the pressure relief part.

In the above technical solution, the pressure relief member is provided with two parts, the pressure relief part and the fastening part. The indentation groove is provided on the pressure relief part to allow the pressure relief part to relieve pressure when internal pressure or temperature of the battery cell reaches the threshold. The fastening part is provided on the outer peripheral side of the pressure relief part, and the outer surface of the fastening part is further away from the interior of the battery cell than the outer surface of the pressure relief part, such that the stepped surface is formed between the fastening part and the pressure relief part. In this way, when at least part of the fastening part is accommodated in the first restraint slot of the restraint member, the stepped surface between the fastening part and the pressure relief part allows the side wall of the first restraint slot to abut against. Such structure is simple and stable, and allows the first restraint slot to restrict the pressure relief member.

In some embodiments, the restraint member includes a body part, a first restraint part, and a second restraint part, where the body part is attached to the connecting member; in the thickness direction of the end cover, the body part is configured to press against the fastening part; the first restraint part and the second restraint part are convexly provided on a side of the body part facing the pressure relief member; both the first restraint part and the second restraint part are annular structures extending in a circumferential direction of the pressure relief hole; the second restraint part is located on an inner side of the first restraint part; and the second restraint part, the body part, and the first restraint part together define the first restraint slot; and the end cover assembly further includes an insulating member, where in the thickness direction of the end cover, at least part of the insulating member is located between the fastening part and the body part to insulate the pressure relief member from the restraint member.

In the above technical solution, the restraint member is provided with the body part, the first restraint part, and the second restraint part. The body part is configured to press against the fastening part of the pressure relief member so that the body part can clamp the pressure relief member in cooperation with the connecting member. The first restraint part and the second restraint part are both convexly disposed on the side of the body part facing the pressure relief member. The second restraint part is disposed on the inner side of the first restraint part, so that the second restraint part and the first restraint part are spaced apart in the predetermined direction. The second restraint part, the body part, and the first restraint part together define the first restraint slot for accommodating the fastening part of the pressure relief member. In addition, the insulating member is provided between the fastening part and the body part to insulate the pressure relief member from the restraint member. In other words, the insulating member enables electrical insulation between the pressure relief member and the restraint member to reduce the occurrence of electrical conduction between the pressure relief member and the restraint member, thereby decreasing safety hazards in a battery cell having such end cover assembly.

In some embodiments, the insulating member includes a first insulator, where the first insulator includes a first insulating part, a second insulating part, and a third insulating part; the second insulating part is accommodated in the first restraint slot; in the thickness direction of the end cover, the first insulating part and the third insulating part are convexly provided on a side of the second insulating part facing the pressure relief member; both the first insulating part and the third insulating part are annular structures extending in the circumferential direction of the pressure relief hole; the third insulating part is located on an inner side of the first insulating part; and the first insulating part, the second insulating part, and the third insulating part together define a second restraint slot, and the second restraint slot is configured to accommodate part of the fastening part to restrict movement of the pressure relief member in the predetermined direction; at least part of the first insulating part is located between an inner peripheral surface of the first restraint part and an outer peripheral surface of the pressure relief member; and/or at least part of the third insulating part is located between an outer peripheral surface of the second restraint part and the stepped surface.

In the above technical solution, the first insulator is provided with the first insulating part, the second insulating part, and the third insulating part. The second insulating part is accommodated in the first restraint slot of the restraint member and the first insulating part and the third insulating part are convexly disposed on the side of the second insulating part facing the pressure relief member, so that the first insulating part, the second insulating part, and the third insulating part define the second restraint slot for accommodating the fastening part of the pressure relief member. In this way, while restricting the movement of the insulating member along the predetermined direction, the restraint member can indirectly restrict the movement of the pressure relief member along the predetermined direction through the insulating member. Additionally, the insulation between the restraint member and the pressure relief member can be effectively ensured. In addition, at least part of the first insulating part is disposed between the inner peripheral surface of the first restraint part and the outer peripheral surface of the pressure relief member, so that the first restraint part and the pressure relief member can be insulated from each other. Similarly, at least part of the third insulating part is disposed between the outer peripheral surface of the second restraint part and the stepped surface of the pressure relief member, so that the second restraint part and the pressure relief member can be insulated from each other.

In some embodiments, the insulating member further includes a second insulator attached to the third insulating part, where the second insulator is convexly disposed on an inner peripheral surface of the third insulating part and is located between the second restraint part and the pressure relief part in the thickness direction of the end cover.

In the above technical solution, the insulating member is further provided with the second insulator attached to the third insulating part. The second insulator is convexly provided on the inner peripheral surface of the third insulating part, and is disposed between the second restraint part of the restraint member and the pressure relief part of the pressure relief member in the thickness direction of the end cover to separate the pressure relief part of the pressure relief member from the second restraint part of the restraint member, allowing the insulating member to better insulate the pressure relief member from the restraint member.

According to a second aspect, an embodiment of this application further provides a battery cell including an electrode assembly, a housing, and the foregoing end cover assembly, where the housing has an opening, and the housing is configured to accommodate the electrode assembly; and the end cover is configured to cover the opening.

In some embodiments, the housing and the end cover are made of a same material, and the housing is welded to the end cover.

In the above technical solution, the housing and the end cover are made of the same material, so that for the battery cell employing this structure, the housing and the end cover can be welded together, thus providing a strong connection between the housing and the end cover assembly. In addition, since the housing and the end cover are made of the same material, hardness of the housing is greater than the hardness of the pressure relief member, helping improve the shock resistance of the housing. In this way, when internal pressure of the battery cell increases, the gas inside the battery cell will first impact the pressure relief member with smaller hardness to achieve stable pressure relief, thereby reducing the safety hazards of the battery cell.

According to a third aspect, an embodiment of this application further provides a battery including a box and the foregoing battery cell, where the box is configured to accommodate the battery cell.

According to a fourth aspect, an embodiment of this application further provides an electric apparatus including the foregoing battery.

According to a fifth aspect, an embodiment of this application further provides a manufacturing method of end cover assembly, where the manufacturing method includes:

providing an end cover;

providing a pressure relief member, where the pressure relief member is provided with an indentation groove, and the pressure relief member is configured to crack along the indentation groove to release internal pressure of a battery cell when internal pressure or temperature of the battery cell reaches a threshold; and mounting the pressure relief member to the end cover;

where hardness of the pressure relief member is lower than hardness of the end cover.

According to a sixth aspect, an embodiment of this application further provides a manufacturing device of end cover assembly, where the manufacturing device includes a first providing means, a second providing means, and an assembly means, where the first providing means is configured to provide an end cover; the second providing means is configured to provide a pressure relief member, the pressure relief member is provided with an indentation groove and the pressure relief member is configured to crack along the indentation groove to release internal pressure of the battery cell when internal pressure or temperature of a battery cell reaches a threshold; and the assembly means is configured to mount the pressure relief member to the end cover, where hardness of the pressure relief member is lower than hardness of the end cover.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

Figure 1:
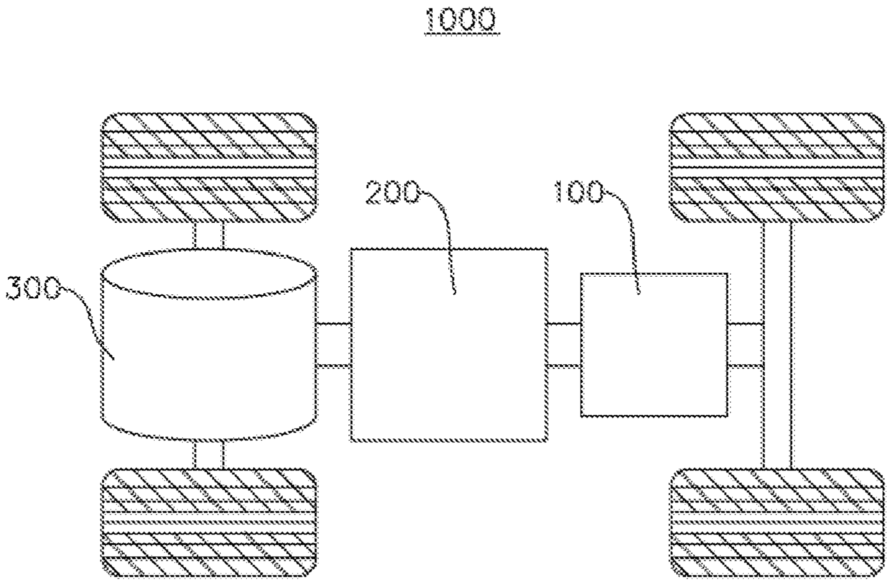
FIG. 1 is a schematic structural diagram of a vehicle according to some embodiments of this application.

Reference signs: 1000. Vehicle; 100. Battery; 10. Box; 11. First part; 12. Second part; 20. Battery cell; 21. Electrode assembly; 22. Housing; 221. Sealed space; 23. End cover assembly; 231. End cover; 2311. Positioning hole; 232. Pressure relief member; 2321. Indentation groove; 2322. Pressure relief part; 2323. Fastening part; 2324. Stepped surface; 233. Positive electrode terminal; 234. Negative electrode terminal; 235. Connecting member; 2351. Pressure relief hole; 2352. First connecting part; 2353. Second connecting part; 2354. Abutting surface; 2355. Restraint projection; 236. Restraint member; 2361. First restraint slot; 2362. Body part; 2363. First restraint part; 2364. Second restraint part; 237. Seal; 238. Insulating member; 2381. First insulator; 2381*a*. Second restraint slot; 2381*b*. First insulating part; 2381*c*. Second insulating part; 2381*d*. Third insulating part; 2382. Second insulator; 200. Controller; 300. Motor; 2000. Manufacturing device; 2100. First providing means; 2200. Second providing means; 2300. Assembly means; X. Predetermined direction.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated apparatuses in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together.

The separator may be made of PP (polypropylene, polypropylene), PE (polyethylene, polyethylene), or the like. In addition, the electrode assembly may be a winding structure or a stacked structure, but the embodiments of this application are not limited thereto.

With outstanding advantages such as high energy density, low environmental pollution, high power density, long service life, wide application range, and small self-discharge coefficient, lithium-ion batteries have been one of the most widely used battery types in the world and an important part of new energy development. With the continuous development of lithium-ion battery technology, higher requirements have been placed on the safety performance of lithium-ion batteries. Pressure relief members on lithium-ion batteries have an important effect on the safety performance of lithium-ion batteries. When the internal pressure of a lithium-ion battery rises sharply, the end cover assembly of the end cover assembly needs to be actuated to relieve the internal pressure to the outside, thus preventing explosion of the lithium-ion battery.

The inventors have found that when a lithium-ion battery suffers from a short circuit, overcharging, or other phenomena, the battery is prone to internal thermal runaway, which in turn leads to a rapid increase of internal pressure, posing safety hazards such as fire and explosion. In the related art, in order to reduce the risk of battery explosion, an aluminum housing and an aluminum end cover are usually used, and an aluminum pressure relief member is welded to the end cover so that when the battery cell undergoes thermal runaway, the internal pressure can break through the pressure relief member to relieve the internal pressure and reduce the risk of fire and explosion of the battery cell. However, the housing and end cover made of aluminum cannot withstand high temperatures and are prone to premature melting in high-temperature environments, which easily causes incidents such as fire and explosion of the battery. To solve this problem, in the related art, typically a steel housing with higher hardness is used to alleviate the problem of high-temperature melting, and a pressure relief member having a pressure relief groove is provided on the steel housing to implement pressure relief. However, because the hardness of the steel housing is high and the pressure relief groove is usually directly stamped on the steel, it is difficult to ensure the processing accuracy of the pressure relief groove, and thus the pressure relief member cannot crack along the indentation groove and release internal pressure of the battery cell when internal pressure or temperature of the battery cell reaches the threshold. This leaves the battery cell at risk of fire and explosion, posing significant safety hazards during use.

Considering the above issues, in order to solve the security risks associated with the use of battery cells, the inventors have conducted in-depth research and designed an end cover assembly, where an end cover is provided with a pressure relief member, and the pressure relief member is provided with an indentation groove. The pressure relief member is configured to crack along the indentation groove to release internal pressure of a battery cell when internal pressure or temperature of the battery cell reaches a threshold. Material hardness of the pressure relief member is lower than material hardness of the end cover.

The end cover assembly employing this structure is used for battery cells, and the pressure relief member for releasing internal pressure of the battery cell is installed on the end cover of the end cover assembly. The hardness of the pressure relief member is designed to be lower than the hardness of the end cover, which facilitates provision of the indentation groove on the pressure relief member and ensures the processing accuracy of the indentation groove. In this way, when internal pressure or temperature of the battery cell reaches the threshold, the pressure relief member can crack along the indentation groove and release internal pressure of the battery cell, so as to reduce safety risks such as fire and explosion during use of the battery cell.

In the actual use, the hardness of the pressure relief member is designed to be lower than the hardness of the end cover, which ensures the hardness of the end cover, and is also convenient for the gas inside the battery cell to blow open the indentation groove of the pressure relief member, with no need to make the depth of the indentation groove too deep. This allows for a thicker bottom wall thickness of the indentation groove to enhance the anti-deformation capability of the pressure relief member, thereby reducing the occurrence of impaired shock resistance of the pressure relief member caused by the deformation of the pressure relief member under external force. Thus, the pressure relief member can crack along the indentation groove in a timely manner when internal pressure or temperature of the battery cell reaches the threshold.

In addition, because the hardness of the end cover is higher than the hardness of the pressure relief member, when internal pressure in the battery cell increases, the gas inside the battery cell will first impact the pressure relief member with lower hardness, so that the pressure relief member can implement the pressure relief function, thus facilitating the controllable exhaust direction of the battery cell.

The end cover assembly disclosed in the embodiments of this application may be used without limitation in electric apparatuses such as vehicles, ships, or aircrafts. The end cover assembly, the battery, and the like disclosed in this application may be used to constitute a power supply system for that electric apparatus, which helps alleviate the risks of battery fire and explosion and improves the service life and safety of the battery.

An embodiment of this application provides an electric apparatus that uses a battery as a power source. The electric apparatus may be but is not limited to a mobile phone, a tablet, a laptop computer, an electric toy, an electrical tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of this application being a vehicle 1000 is used as an example for description of the following embodiments.

Refer to FIG. 1. FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power supply for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
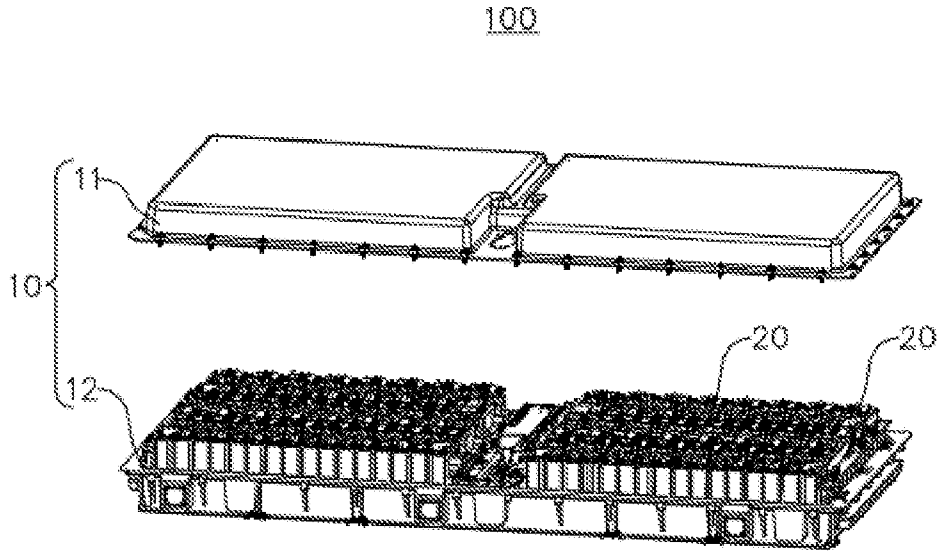
FIG. 2 is an exploded view of a structure of a battery according to some embodiments of this application.

Refer to FIG. 2. FIG. 2 is a structural exploded view of a battery 100 according to some embodiments of this application. The battery 100 includes a box 10 and a battery cell 20, where the box 10 is configured to accommodate the battery cell 20. The box 10 is configured to provide an accommodating space for the battery cell 20, and the box 10 may be of various structures. In some embodiments, the box 10 may include a first part 11 and a second part 12. The first part 11 and the second part 12 fit together so that the first part 11 and the second part 12 jointly define the accommodating space for accommodating the battery cell 20. The second part 12 may be a hollow structure with one end open, and the first part 11 may be a plate structure. The first part 11 covers the open end of the second part 12, so that the first part 11 and the second part 12 jointly define an accommodating space. Alternatively, both the first part 11 and the second part 12 may be a hollow structure with one end open, and the open end of the first part 11 covers the open end of the second part 12. The box 10 formed by the first part 11 and the second part 12 may be in various shapes, for example, cylinder or cuboid.

In the battery 100, a plurality of battery cells 20 may be provided, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10; or certainly, the battery 100 may be formed by a plurality of battery cells 20 connected in series, parallel, or series-parallel first to form a battery module and then a plurality of battery modules being connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 3:
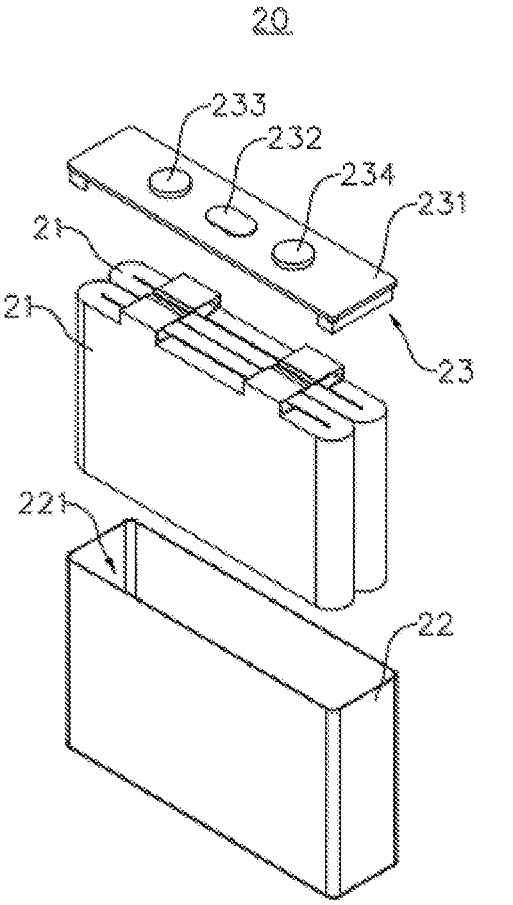
FIG. 3 is an exploded view of a structure of a battery cell according to some embodiments of this application.

Refer to FIG. 3. FIG. 3 is an exploded view of a structure of a battery cell 20 according to some embodiments of this application. The battery cell 20 includes an electrode assembly 21, a housing 22, and an end cover assembly 23, where the housing 22 has an opening, and the housing 22 is configured to accommodate the electrode assembly 21; and the end cover assembly 23 is configured to cover the opening of the housing 22.

The electrode assembly 21 is a component in the battery cell 20 in which electrochemical reactions take place. The electrode assembly 21 may include a positive electrode plate, a negative electrode plate, and a separator. The electrode assembly 21 may be a winding structure formed by winding the positive electrode plate, the separator, and the negative electrode plate, or may be a laminated structure formed by laminating the positive electrode plate, the separator, and the negative electrode plate. For example, in FIG.

3, the electrode assembly 21 is a winding structure formed by winding the positive electrode plate, the separator, and the negative electrode plate.

The housing 22 may be further configured to accommodate an electrolyte such as a liquid electrolyte. The housing 22 may be in various structure forms.

In some embodiments, the housing 22 is a hollow structure with an open side. The end cover assembly 23 covers the opening of the housing 22 to form a sealed connection, thereby forming a sealed space 221 to accommodate the electrode assembly 21 and electrolyte. In assembling the battery cell 20, the electrode assembly 21 can be first put into the housing 22, the electrolyte is injected into the housing 22, and then the opening of the housing 22 is covered with the end cover assembly 23.

The housing 22 may be in various shapes, such as a cylindrical shape or a cuboid shape. The shape of the housing 22 may be determined based on a specific shape of the electrode assembly 21. For example, if the electrode assembly 21 is a cylinder structure, a cylindrical housing may be selected; and if the electrode assembly 21 is a cuboid structure, a cuboid housing may be selected. Certainly, the end cover assembly 23 can also be of a variety of structures. The end cover assembly 23 may match the housing 22 in shape, for example, the end cover assembly 23 is a plate structure, a hollow structure with one open end, or the like. For example, in FIG. 3, the housing 22 is a cuboid structure, and the end cover assembly 23 is a plate structure that covers the opening of the housing 22.

It should be understood that the battery cell 20 is not limited to the foregoing structures, and may also be other structures. For example, the battery cell 20 includes a housing 22 and two end cover assemblies 23. The housing 22 is a hollow structure with an opening on two opposite sides, and one end cover assembly 23 covers one opening of the housing 22 to form a sealed connection so as to form a sealed space 221 for accommodating the electrode assembly 21 and the electrolyte.

It should be noted that in the embodiments of this application, the housing 22 may accommodate one or more electrode assemblies 21. For example, in FIG. 3, there are two electrode assemblies 21, and the two electrode assemblies 21 are stacked.

The end cover assembly 23 is an assembly that covers the opening of the housing 22 to isolate an internal environment of the battery cell 20 from an external environment.

Figure 4:
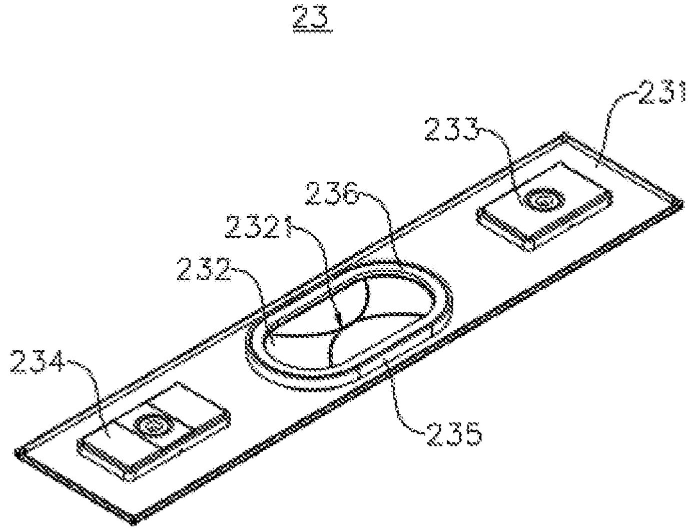
FIG. 4 is a schematic structural diagram of an end cover assembly according to some embodiments of this application.

According to some embodiments of this application, refer to FIG. 3, and further refer to FIG. 4. FIG. 4 is a schematic structural diagram of an end cover assembly 23 according to some embodiments of this application. This application provides an end cover assembly 23. The end cover assembly 23 includes an end cover 231 and a pressure relief member 232. The pressure relief member 232 is provided in the end cover 231, and the pressure relief member 232 is provided with an indentation groove 2321. The pressure relief member 232 is configured to crack along the indentation groove 2321 to release internal pressure of the battery cell 20 when internal pressure or temperature of the battery cell 20 reaches a threshold. Hardness of the pressure relief member 232 is lower than hardness of the end cover 231.

The pressure relief member 232 is configured to crack along the indentation groove 2321 when internal pressure or temperature of the battery cell 20 reaches the threshold, which means that the pressure relief member 232 will arch outward under the effect of gas inside the battery cell 20 when the internal pressure or temperature of the battery cell 20 reaches the threshold, causing the pressure relief member 232 to crack along the indentation groove 2321 and relieve the gas inside the battery cell 20, thus achieving the purpose of pressure relief.

Optionally, the pressure relief member 232 is a sheet-like structure, and the indentation groove 2321 provided on the pressure relief member 232 may be a cross structure, a semi-circular cross structure, or an annular structure. For example, in FIG. 4, the indentation groove 2321 provided on the pressure relief member 232 is an annular structure, and two semi-circular structures are formed within the annular structure, the two semi-circular structures being tangent to each other. In addition, in the thickness direction of the end cover 231, the indentation groove 2321 may be provided on a side of the pressure relief member 232 facing the sealed space 221 of the housing 22 or on a side of the pressure relief member 232 facing away from the sealed space 221 of the housing 22.

In some embodiments, the end cover assembly 23 may further include a positive electrode terminal 233 and a negative electrode terminal 234, and both the positive electrode terminal 233 and the negative electrode terminal 234 are mounted on the end cover 231. Both the positive electrode terminal 233 and the negative electrode terminal 234 are configured to be electrically connected to the electrode assembly 21.

For example, as shown in FIG. 4, the pressure relief member 232 is provided between the positive electrode terminal 233 and the negative electrode terminal 234.

The end cover assembly 23 using such structure facilitates provision of the indentation groove 2321 on the pressure relief member 232, and ensures the processing accuracy of the indentation groove 2321. In this way, when internal pressure or temperature of the battery cell 20 reaches the threshold, the pressure relief member 232 can crack along the indentation groove 2321 and release internal pressure of the battery cell 20, thus reducing the risk of fire or explosion of the battery cell 20 during use. In addition, while ensuring the hardness of the end cover 231, this is also convenient for the gas inside the battery cell 20 to blow open the indentation groove 2321 of the pressure relief member 232, with no need to make the depth of the indentation groove 2321 too deep. This allows for a thicker bottom wall of the indentation groove 2321 to enhance the anti-deformation capability of the pressure relief member 232, thereby effectively reducing the occurrence of impaired shock resistance of the pressure relief member 232 caused by the deformation of the groove bottom wall of the indentation groove 2321 under external force. Thus, the pressure relief member 232 can crack along the indentation groove 2321 only when internal pressure or temperature of the battery cell 20 reaches the threshold, helping ensure the stable relief pressure of the pressure relief member 232. In addition, because the hardness of the end cover 231 is higher than the hardness of the pressure relief member 232, when internal pressure in the battery cell 20 increases, the gas inside the battery cell 20 will first cause the pressure relief member 232 with lower hardness to crack, so that the pressure relief member 232 can implement the pressure relief function, thus facilitating the controllable exhaust direction of the battery cell 20.

According to some embodiments of this application, a melting point of the pressure relief member 232 is lower than a melting point of the end cover 231.

The melting point of the end cover 231 is designed to be higher than the melting point of the pressure relief member 232, so that the end cover 231 can withstand higher temperature than the pressure relief member 232 in the case of thermal runaway in the battery cell 20. This can effectively reduce the occurrence of premature melting of the end cover 231, so that the gas inside the battery cell 20 can be stably relieved through the pressure relief member 232, thereby effectively reducing the risk of fire and explosion in the battery cell 20.

In some embodiments, the melting point of the end cover 231 is higher than 1,000 degrees Celsius.

Optionally, a material of the pressure relief member 232 may be aluminum, copper, or the like; and a material of the end cover 231 may be steel, nickel, or the like.

The melting point of the end cover 231 is set to be higher than 1,000 degrees Celsius, so that the end cover 231 can withstand most of the high temperature environments during use, effectively reducing the occurrence of premature melting of the end cover 231 and improving the safety of using the battery cell 20.

According to some embodiments of this application, a material of the end cover 231 includes steel.

The end cover 231 made of steel has a high hardness and melting point, which can improve the structural strength and high-temperature resistance of the end cover 231, thereby effectively reducing the occurrence of premature melting of the end cover 231 and playing a good explosion-proof role. In addition, the end cover 231 of this material has lower cost and is easy to process and manufacture.

According to some embodiments of this application, a material of the pressure relief member 232 includes aluminum.

The pressure relief member 232 made of softer aluminum material facilitates provision of the indentation groove 2321 on the pressure relief member 232, with lower cost, and also allows for easier relief of gas from inside the battery cell 20 through the pressure relief member 232, thus achieving a good pressure relief effect.

Figure 5:
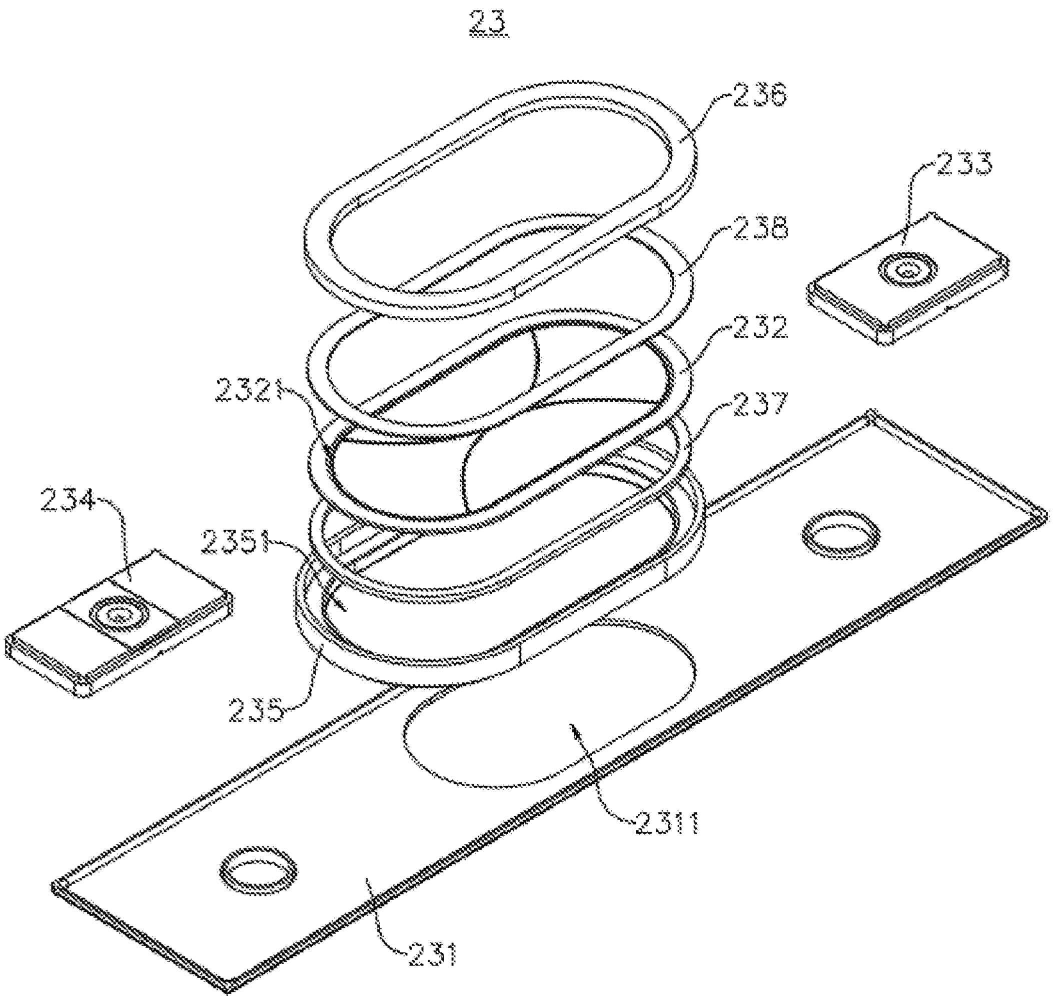
FIG. 5 is an exploded view of a structure of an end cover assembly according to some embodiments of this application.

According to some embodiments of this application, refer to FIG. 4, and further refer to FIG. 5. FIG. 5 is an exploded view of a structure of an end cover assembly 23 according to some embodiments of this application. The end cover assembly 23 further includes a connecting member 235 and a restraint member 236. The connecting member 235 is attached to the end cover 231. The connecting member 235 is provided with a pressure relief hole 2351, where the pressure relief hole 2351 is configured to communicate with the interior of the battery cell 20, and the pressure relief member 232 covers the pressure relief hole 2351. The restraint member 236 is attached to the connecting member 235, and in the thickness direction of the end cover 231, the restraint member 236 and the connecting member 235 are configured to clamp a portion of the pressure relief member 232.

The pressure relief hole 2351 communicates with the interior of the battery cell 20, that is, the pressure relief hole 2351 provided on the connecting member 235 communicates with the sealed space 221 of the housing 22 for accommodating the electrode assembly 21 and electrolyte, so that gas inside the housing 22 can be relieved through the pressure relief hole 2351.

Optionally, in FIG. 5, the connecting member 235 and the restraint member 236 are separate structures. After connected to the connecting member 235, the restraint member 236 exerts a pressure on the pressure relief member 232, so that the restraint member 236 cooperates with the connecting member 235 to clamp a portion of the pressure relief member 232. For example, the restraint member 236 cooperates with the connecting member 235 to clamp the edge of the pressure relief member 232. Certainly, in other embodiments, the connecting member 235 and the restraint member 236 may be an integrally formed structure. For example, the restraint member 236 is formed by bending or winding the edge of the connecting member 235. Specifically, after the pressure relief member 232 is provided on the connecting member 235, the edge of the connecting member 235 is wound or folded so that the edge of the connecting member 235 presses against a side of the pressure relief member 232 facing away from the connecting member 235, thereby achieving the purpose of clamping the pressure relief member 232.

The restraint member 236 is attached to the connecting member 235, so that the restraint member 236 and the connecting member 235 can cooperate to clamp a portion of the pressure relief member 232. With this structure, the pressure relief member 232 can be mounted on the end cover 231 made of a different material. In addition, the connecting member 235 is provided with the pressure relief hole 2351 for communication with the interior of the battery cell and the pressure relief member 232 covers the pressure relief hole 2351 so that the pressure relief member 232 can meet the pressure relief requirements of the battery cell 20.

Figure 6:
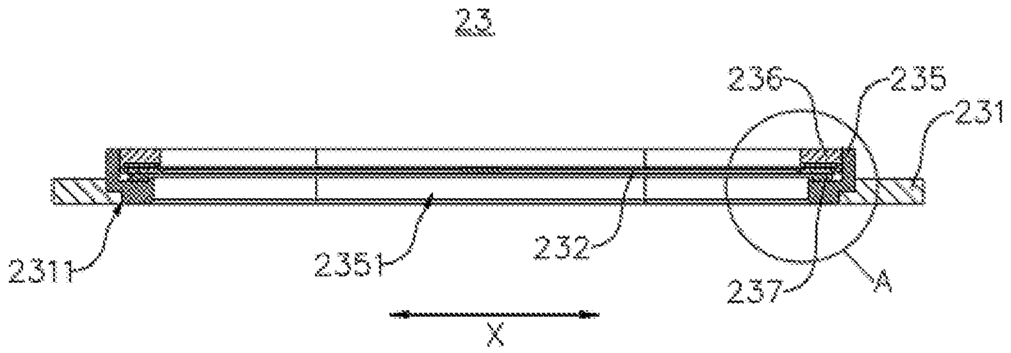
FIG. 6 is a cross-sectional view of an end cover assembly according to some embodiments of this application.
Figure 7:
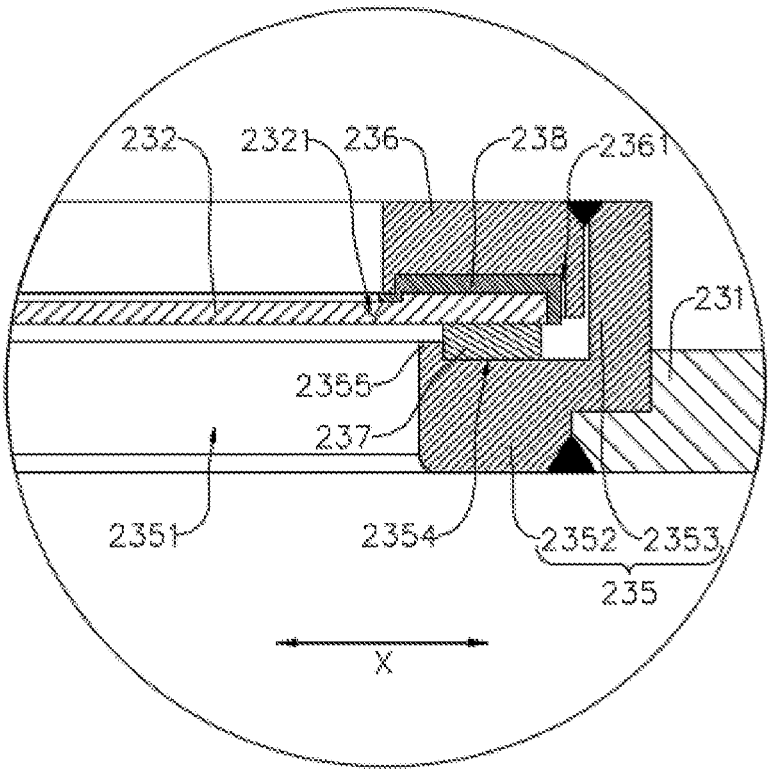
FIG. 7 is a locally enlarged view of position A of the end cover assembly shown in FIG. 6.

According to some embodiments of this application, refer to FIG. 5, and further refer to FIG. 6 and FIG. 7. FIG. 6 is a cross-sectional view of an end cover assembly 23 provided in some embodiments of this application, and FIG. 7 is a locally enlarged view of position A of the end cover assembly 23 shown in FIG. 6. The connecting member 235 includes a first connecting part 2352 and a second connecting part 2353. The first connecting part 2352 is attached to the end cover 231, and the pressure relief hole 2351 is provided in the first connecting part 2352. The second connecting part 2353 is disposed around an edge of the first connecting part 2352. Both the restraint member 236 and the pressure relief member 232 are located on an inner peripheral side of the second connecting part 2353, and the restraint member 236 is connected to the second connecting part 2353. In the thickness direction of the end cover 231, the restraint member 236 and the first connecting part 2352 are configured to clamp a portion of the pressure relief member 232.

Both the first connecting part 2352 and the second connecting part 2353 are annular structures extending in a circumferential direction of the pressure relief hole 2351, that is, both the first connecting part 2352 and the second connecting part 2353 are structures around the central axis of the pressure relief hole 2351. The second connecting part 2353 is disposed around the edge of the first connecting part 2352, and the restraint member 236 and the pressure relief member 232 are both located on the inner peripheral side of the second connecting part 2353. To be specific, the first connecting part 2352 is connected to the inner peripheral surface of the second connecting part 2353, so that the restraint member 236 and the pressure relief member 232 can be placed on the first connecting part 2352 after being provided on the inner peripheral side of the second connecting part 2353, thereby allowing the restraint member 236 to cooperate with the first connecting part 2352 to clamp the pressure relief member 232.

Optionally, the first connecting part 2352 and the second connecting part 2353 are an integrally formed structure, that is, the first connecting part 2352 and the second connecting part 2353 are an integral structure, and the first connecting part 2352 and the second connecting part 2353 are formed by casting or stamping. In other embodiments, the first connecting part 2352 and the second connecting part 2353 may alternatively be separate structures, where the first connecting part 2352 is fixedly connected to the second connecting part 2353 by welding, bonding, or other means.

The connecting member 235 includes the first connecting part 2352 and the second connecting part 2353, the first connecting part 2352 is attached to the end cover 231, and the second connecting part 2353 is disposed around an outer side of the first connecting part 2352, so that the restraint member 236 and the pressure relief member 232 can be disposed on the inner peripheral side of the second connecting part 2353. After the restraint member 236 is connected to the second connecting part 2353, the restraint member 236 can cooperate with the first connecting part 2352 to clamp the pressure relief member 232 to fasten the pressure relief member 232. The connecting member 235 with this structure is advantageous in improving the structural stability of the end cover assembly 23, and facilitates the assembling of the end cover assembly 23.

According to some embodiments of this application, still referring to FIGS. 5, 6 and 7, the end cover 231 is provided with a positioning hole 2311 running through inner and outer surfaces of the end cover. At least part of the first connecting part 2352 is inserted in the positioning hole 2311.

A projection of the pressure relief hole 2351 in the thickness direction of the end cover 231 is located within the positioning hole 2311, and the positioning hole 2311 communicates with the pressure relief hole 2351 so that the pressure relief hole 2351 communicates with the sealed space 221 of the housing 22 of the battery cell 20.

Referring to FIGS. 6 and 7, aperture of the positioning hole 2311 is larger than aperture of the pressure relief hole 2351 to allow the first connecting part 2352 of the connecting member 235 to be inserted into the positioning hole 2311 for positioning the connecting member 235 and the end cover 231. Optionally, an annular projection extending in a circumferential direction of the positioning hole 2311 is convexly provided on a wall of the positioning hole 2311 so that the positioning hole 2311 forms a stepped hole structure. A stepped slot is provided on an outer peripheral surface of the first connecting part 2352. When the first connecting part 2352 is inserted into the positioning hole 2311, the annular projection on the wall of the positioning hole 2311 can engage into the stepped slot of the first connecting part 2352, so that the positioning hole 2311 can position the connecting member 235 and can also restrict the connecting member 235 in the thickness direction of the end cover 231.

The positioning hole 2311 is provided in the end cover 231 so that at least part of the first connecting part 2352 can be inserted into the positioning hole 2311 to implement positioning and restraint functions for the connecting member 235, thereby improving the installation accuracy between the connecting member 235 and the end cover 231.

According to some embodiments of this application, still referring to FIGS. 5, 6 and 7, the restraint member 236 is an annular structure extending in a circumferential direction of the pressure relief member 232.

The restraint member 236 is an annular structure extending in the circumferential direction of the pressure relief member 232, that is, the restraint member 236 is a structure around the geometric center of the pressure relief member 232. In other embodiments, the restraint member 236 may be another structure. For example, the structure of the restraint member 236 is a plurality of restraint blocks that are spaced apart in the circumferential direction of the pressure relief member 232. The plurality of restraint blocks are configured to clamp a portion of the pressure relief member 232 in cooperation with the first connecting part 2352 of the connecting member 235.

The restraint member 236 is provided as an annular structure extending in the circumferential direction of the pressure relief member 232, so that the restraint member 236 can cooperate with the connecting member 235 to clamp the pressure relief member 232 in the circumferential direction, allowing the pressure relief member 232 to be more stably mounted on the end cover 231.

In some embodiments, the restraint member 236 is located on an outer peripheral side of the indentation groove 2321.

The restraint member 236 is located on the outer peripheral side of the indentation groove 2321, that is, the indentation groove 2321 on the pressure relief member 232 is located on an inner peripheral side of the restraint member 236, so that the restraint member 236 can effectively avoid the indentation groove 2321.

The restraint member 236 is disposed on the outer peripheral side of the indentation groove 2321 of the pressure relief member 232, so that the restraint member 236 can effectively avoid the position of the indentation groove 2321 of the pressure relief member 232 when the restraint member 236 clamps the pressure relief member 232 in cooperation with the connecting member 235. This ensures that the restraint member 236 does not affect the pressure relief member 232 cracking along the indentation groove 2321 when internal pressure or temperature of the battery cell 20 reaches the threshold.

According to some embodiments of this application, the connecting member 235 and the end cover 231 are made of a same material, and the connecting member 235 is welded to the end cover 231.

For example, the material of both the connecting member 235 and the end cover 231 is steel.

It should be noted that in other embodiments, the connecting member 235 may alternatively be attached to the end cover 231 by screwing, gluing, or other means.

The connecting member 235 and the end cover 231 are made of the same material, so that the connecting member 235 can be welded to the end cover 231 to effectively improve the connection strength between the connecting member 235 and the end cover 231, thereby improving the structural strength of the end cover assembly 23.

According to some embodiments of this application, the restraint member 236 and the connecting member 235 are made of a same material, and the restraint member 236 is welded to the connecting member 235.

For example, both the restraint member 236 and the connecting member 235 are made of steel.

It should be noted that in other embodiments, the restraint member 236 can alternatively be connected to the second connecting part 2353 of the connecting member 235 by screwing, gluing, or other means.

The restraint member 236 and the connecting member 235 are made of the same material, so that the restraint member 236 can be welded to the connecting member 235 to effectively improve the connection strength between the restraint member 236 and the connecting member 235, thereby improving the structural strength of the end cover assembly 23.

According to some embodiments of this application, still referring to FIGS. 5, 6 and 7, the end cover assembly 23 further includes a seal 237. In the thickness direction of the end cover 231, at least part of the seal 237 is located between the connecting member 235 and the pressure relief member 232. The seal 237 is configured to seal the connecting member 235 and the pressure relief member 232.

The seal 237 is an annular structure extending in the circumferential direction of the pressure relief hole 2351. The seal 237 is provided between the pressure relief member 232 and the first connecting part 2352 of the connecting member 235, that is, in the thickness direction of the end cover 231, the seal 237 is provided on a side of the pressure relief member 232 facing away from the restraint member 236, so that the seal 237 can seal the gap between the pressure relief member 232 and the first connecting part 2352 of the connecting member 235.

For example, a material of the seal 237 may be rubber, silicone, plastic, or the like.

The seal 237 is provided between the connecting member 235 and the pressure relief member 232, so that the seal 237 can fill the gap between the connecting member 235 and the pressure relief member 232 to reduce leakage of gas from inside the battery cell 20 through the gap between the connecting member 235 and the pressure relief member 232, thus reducing the possibility of failure of the pressure relief member 232 and improving the safety of using the battery cell 20 having such end cover assembly 23.

According to some embodiments of this application, referring to FIG. 7, in the thickness direction of the end cover 231, the connecting member 235 has an abutting surface 2354 for the seal 237 to abut against. The abutting surface 2354 is provided with a restraint projection 2355. The restraint projection 2355 is an annular structure extending in the circumferential direction of the pressure relief hole 2351, and the seal 237 fits around an outer peripheral surface of the restraint projection 2355.

The connecting member 235 has the abutting surface 2354 for the seal 237 to abut against, that is, in the thickness direction of the end cover 231, a side of the first connecting part 2352 of the connecting member 235 facing the pressure relief member 232 is the abutting surface 2354 for the seal 237 to abut against.

The restraint projection 2355 is convexly provided on the abutting surface 2354 and is located on an inner peripheral side of the seal 237. For example, the restraint projection 2355 and the first connecting part 2352 is an integral structure, that is, the restraint projection 2355 and the first connecting part 2352 are integrally formed by casting or stamping. In other embodiments, the restraint projection 2355 and the first connecting part 2352 may alternatively be separate structures, and the restraint projection 2355 is connected to the abutting surface 2354 by welding, bonding, or other means.

The connecting member 235 has the abutting surface 2354 for the seal 237 to abut against, so that the seal 237 is located between the abutting surface 2354 and the pressure relief member 232. The abutting surface 2354 is provided with the restraint projection 2355 extending in the circumferential direction of the pressure relief hole 2351, and the seal 237 fits around the outer peripheral surface of the restraint projection 2355, so that the restraint projection 2355 can provide certain restraint for the seal 237 to restrict movement of the seal 237 between the connecting member 235 and the pressure relief member 232, thus improving the sealing effect of the seal 237 on the connecting member 235 and the pressure relief member 232.

According to some embodiments of this application, referring to FIGS. 5, 6 and 7, the end cover assembly 23 further includes an insulating member 238. In the thickness direction of the end cover 231, at least part of the insulating member 238 is located between the pressure relief member 232 and the restraint member 236 to insulate the pressure relief member 232 from the restraint member 236.

The pressure relief member 232 and the restraint member 236 are insulated from each other. In other words, no electrical conduction is formed between the pressure relief member 232 and the restraint member 236, which is achieved by providing the insulating member 238 between the pressure relief member 232 and the restraint member 236.

For example, the insulating member 238 may be made of polyethylene terephthalate (PET), polypropylene (PP), polycarbonate (PC), polyvinyl chloride (PVC), or the like.

At least part of the insulating member 238 is disposed between the pressure relief member 232 and the restraint member 236, so as to insulate the pressure relief member 232 from the restraint member 236. In other words, the insulating member 238 enables electrical insulation between the pressure relief member 232 and the restraint member 236. This reduces the occurrence of electrical conduction between the pressure relief member 232 and the restraint member 236, which is advantageous for improving the service life of the pressure relief member 232 and the safety of using the battery cell 20 having such end cover assembly 23. It should be noted that when the pressure relief member 232 and the restraint member 236 are made of different materials, the insulating member 238 can effectively reduce the occurrence of potential difference between the pressure relief member 232 and the restraint member 236 of different materials. This is advantageous for alleviating the corrosion between the pressure relief member 232 and the restraint member 236, thereby improving the service life of the end cover assembly 23.

Figure 8:
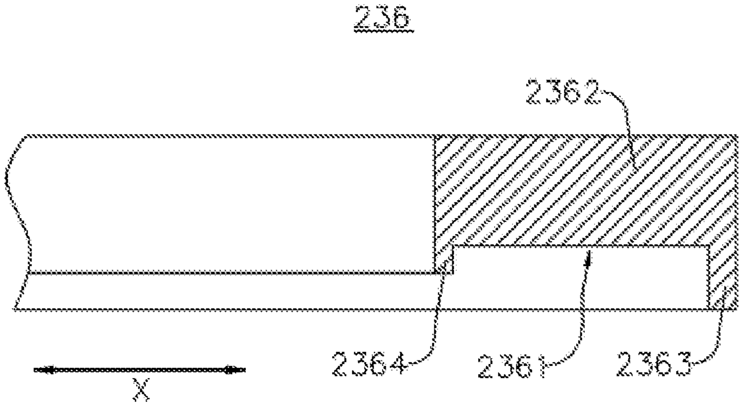
FIG. 8 is a cross-sectional view of a restraint member according to some embodiments of this application.
Figure 9:
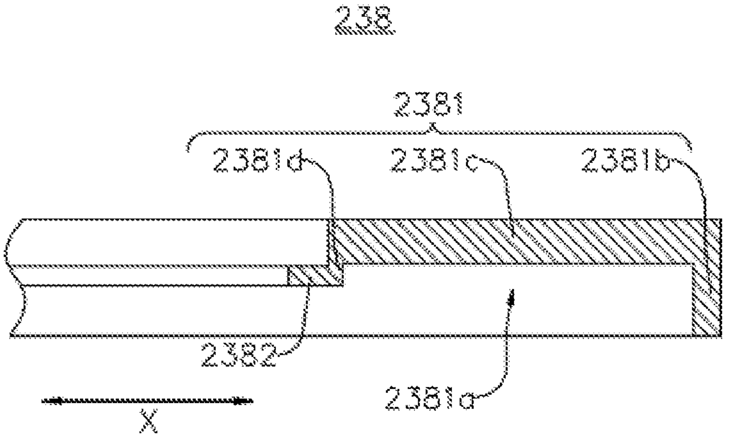
FIG. 9 is a cross-sectional view of an insulating member according to some embodiments of this application.

According to some embodiments of this application, refer to FIG. 7, and further refer to FIGS. 8 and 9. FIG. 8 is a cross-sectional view of the restraint member 236 provided in some embodiments of this application, and FIG. 9 is a cross-sectional view of the insulating member 238 provided in some embodiments of this application. The insulating member 238 includes a first insulator 2381. In the thickness direction of the end cover 231, a first restraint slot 2361 is provided on a side of the restraint member 236 facing the pressure relief member 232. The first restraint slot 2361 is configured to accommodate at least part of the first insulator 2381 to restrict the movement of the insulating member 238 along a predetermined direction X, the predetermined direction X being perpendicular to the thickness direction of the end cover 231.

The restraint member 236 includes a body part 2362, a first restraint part 2363, and a second restraint part 2364. The body part 2362 is attached to the second connecting part 2353 of the connecting member 235. In the thickness direction of the end cover 231, the first restraint part 2363 and the second restraint part 2364 are both convexly provided on a side of the body part 2362 facing the pressure relief member 232. The first restraint part 2363 and the second restraint part 2364 are both annular structures extending in the circumferential direction of the pressure relief hole 2351, and the first restraint part 2363 is located on an outer side of the second restraint part 2364, that is, the first restraint part 2363 and the second restraint part 2364 are spaced apart in the predetermined direction X. In this way, the first restraint part 2363, the body part 2362, and the second restraint part 2364 together define the first restraint slot 2361 for accommodating the first insulator 2381 of the insulating member 238.

It should be noted that the first restraint slot 2361 is configured to accommodate at least part of the first insulator 2381, so as to restrict the movement of the insulating member 238 along the predetermined direction X. Specifically, the first restraint slot 2361 is configured to restrict the movement of the insulating member 238 along the predetermined direction X in a range. In other words, while ensuring that the insulating member 238 provides insulation between the restraint member 236 and the pressure relief member 232, the first restraint slot 2361 allows the insulating member 238 to move within a certain range along the predetermined direction X.

The first restraint slot 2361 is disposed on the side of the restraint member 236 facing the pressure relief member 232, so that at least part of the first insulator 2381 of the insulating member 238 can be accommodated in the first restraint slot 2361, so as to effectively restrict the movement of the insulating member 238 along the predetermined direction X perpendicular to the thickness direction of the end cover 231. This reduces the occurrence of the insulating member 238 detaching from between the pressure relief member 232 and the restraint member 236, allowing the insulating member 238 to better insulate the pressure relief member 232 from the restraint member 236.

According to some embodiments of this application, further refer to FIGS. 7, 8, and 9. In the thickness direction of the end cover 231, a second restraint slot 2381*a* is provided on a side of the first insulator 2381 facing the pressure relief member 232. The second restraint slot 2381*a* is configured to accommodate part of the pressure relief member 232, so as to restrict the movement of the pressure relief member 232 along the predetermined direction X.

The first insulator 2381 includes a first insulating part 2381*b*, a second insulating part 2381*c*, and a third insulating part 2381*d* connected in sequence. The second insulating part 2381*c* is accommodated in the first restraint slot 2361 of the restraint member 236. In the thickness direction of the end cover 231, both the first insulating part 2381*b* and the third insulating part 2381*d* are convexly provided on a side of the second insulating part 2381*c* facing the pressure relief member 232. Moreover, both the first insulating part 2381*b* and the third insulating part 2381*d* are annular structures extending along the circumferential direction of the pressure relief hole 2351, and the third insulating part 2381*d* is located on an inner side of the first insulating part 2381*b*. That is, the third insulating part 2381*d* and the first insulating part 2381*b* are spaced apart along the predetermined direction X. The first insulating part 2381*b*, the second insulating part 2381*c*, and the third insulating part 2381*d* together define the second restraint slot 2381*a* for accommodating a portion of the pressure relief member 232.

Figure 10:
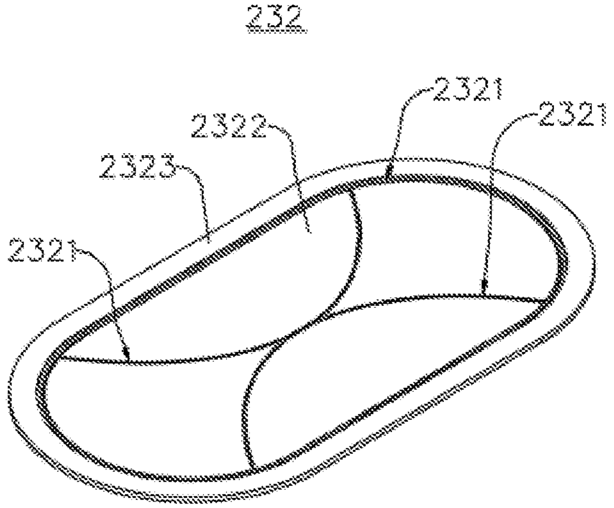
FIG. 10 is a schematic structural diagram of a pressure relief member according to some embodiments of this application.
Figure 11:
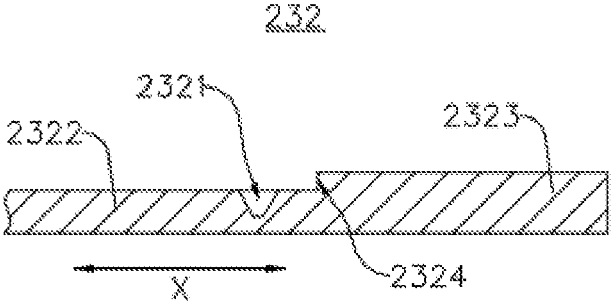
FIG. 11 is a cross-sectional view of a pressure relief member according to some embodiments of this application.

Optionally, referring to FIGS. 10 and 11, FIG. 10 is a schematic structural diagram of the structure of the pressure relief member 232 provided in some embodiments of this application, and FIG. 11 is a cross-sectional view of the pressure relief member 232 provided in some embodiments of this application. The pressure relief member 232 includes a pressure relief part 2322 and a fastening part 2323, and the indentation groove 2321 is provided on the pressure relief part 2322. The fastening part 2323 is an annular structure extending in a circumferential direction of the pressure relief part 2322 and is located on an outer peripheral side of the pressure relief part 2322 along the predetermined direction X. At least part of the fastening part 2323 is accommodated in the second restraint slot 2381*a* of the first insulator 2381. In the thickness direction of the end cover 231, an outer surface of the fastening part 2323 is closer to the outside of the battery cell 20 than an outer surface of the pressure relief part 2322. A stepped surface 2324 is formed between the outer surface of the fastening part 2323 and the outer surface of the pressure relief part 2322, so that the third insulating part 2381*d* can abut against the stepped surface 2324, thereby implementing the restraint function on the pressure relief member 232.

The stepped surface 2324 is formed between the outer surface of the fastening part 2323 and the outer surface of the pressure relief part 2322. That is, in the thickness direction of the end cover 231, a side of the fastening part 2323 facing away from the seal 237 protrudes from one side of the pressure relief part 2322, so that the fastening part 2323 and the pressure relief part 2322 form a stepped structure, thereby forming the stepped surface 2324 between the outer surface of the fastening part 2323 and the outer surface of the pressure relief part 2322.

It should be noted that the second restraint slot 2381*a* is configured to accommodate at least part of the fastening part 2323 so as to restrict the movement of the pressure relief member 232 along the predetermined direction X. This means that the second restraint slot 2381*a* is configured to restrict the movement of the pressure relief member 232 along the predetermined direction X within a range. To be specific, while ensuring that the pressure relief member 232 does not detach from the first connecting part 2352 of the restraint member 236 and the connecting member 235, the second restraint slot 2381*a* allows the pressure relief member 232 to move within a certain range in the predetermined direction X. For example, when the pressure relief member 232 arches due to the effect of the gas inside the battery cell 20, the fastening part 2323 of the pressure relief member 232 will move along the predetermined direction X. In this case, the second restraint slot 2381*a* of the insulating member 238 can restrict the movement of the pressure relief member 232 within a certain range, to ensure that the pressure relief member 232 does not detach from between the restraint member 236 and the first connecting part 2352 of the connecting member 235, thereby effectively reducing the risk of gaps between the restraint member 236 and the connecting member 235.

The second restraint slot 2381*a* is disposed on the side of the first insulator 2381 facing the pressure relief member 232, so that the second restraint slot 2381*a* can accommodate a portion of the pressure relief member 232. In this way, when the gas inside the battery cell 20 arches the pressure relief member 232, the pressure relief member 232 can be effectively restricted from moving in the predetermined direction X, thereby reducing the occurrence of large gaps between the pressure relief member 232 and the connecting member 235 caused by misplacement. This helps improve the installation stability of the pressure relief member 232, and also reduces the leakage of gas inside the battery cell 20.

According to some embodiments of this application, still refer to FIGS. 7, 8 and 9. The insulating member 238 may further include a second insulator 2382. The second insulator 2382 is convexly provided on an inner peripheral surface of the first insulator 2381 and is located between the restraint member 236 and the pressure relief member 232 in the thickness direction of the end cover 231.

The second insulator 2382 is disposed between the second restraint part 2364 of the restraint member 236 and the pressure relief part 2322 of the pressure relief member 232. The second insulator 2382 is connected to the third insulating part 2381*d* of the first insulator 2381 and is convexly provided on the inner peripheral surface of the first insulator 2381. That is, the second insulator 2382 is an annular structure connected to the inner peripheral side of the third insulating part 2381*d* and extends along the circumferential direction of the pressure relief hole 2351.

For example, the second insulator 2382 and the first insulator 2381 is an integral structure. In other embodiments, the second insulator 2382 and the first insulator 2381 may alternatively be separate structures, for example, the second insulator 2382 is attached to the third insulating part 2381*d* of the first insulator 2381 by bonding or other means.

It should be noted that the second insulator 2382 is located on the outer peripheral side of the indentation groove 2321 of the pressure relief part 2322, that is, the indentation groove 2321 is located on an inner peripheral side of the second insulator 2382 in the predetermined direction X, so that the second insulator 2382 can effectively avoid the position of the indentation groove 2321.

The second insulator 2382 is convexly provided on the inner peripheral surface of the first insulator 2381, and the second insulator 2382 is disposed between the restraint member 236 and the pressure relief member 232 in the thickness direction of the end cover 231, so as to separate the pressure relief member 232 from a side wall of the first restraint slot 2361. This allows the insulating member 238 to better insulate the pressure relief member 232 from the restraint member 236.

Figure 12:
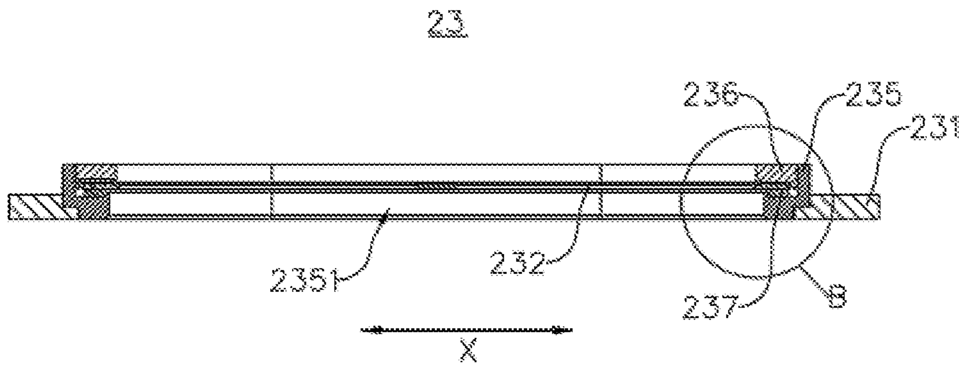
FIG. 12 is a cross-sectional view of an end cover assembly according to some other embodiments of this application.
Figure 13:
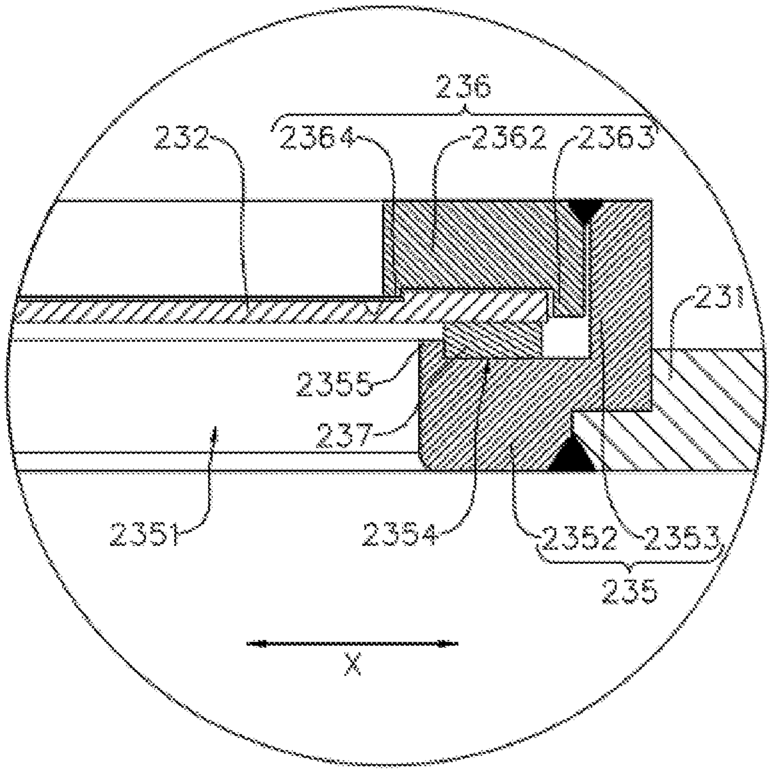
FIG. 13 is a locally enlarged view of position B of the end cover assembly shown in FIG. 12.

According to some embodiments of this application, refer to FIGS. 12 and 13. FIG. 12 is a cross-sectional view of an end cover assembly 23 provided in some other embodiments of this application, and FIG. 13 is a locally enlarged view of position B of the end cover assembly 23 shown in FIG. 12. In the thickness direction of the end cover 231, a first restraint slot 2361 is provided on a side of the restraint member 236 facing the pressure relief member 232. The first restraint slot 2361 is configured to accommodate a portion of the pressure relief member 232 to restrict the movement of the pressure relief member 232 along the predetermined direction X, the predetermined direction X being perpendicular to the thickness direction of the end cover 231.

The first restraint slot 2361 is configured to accommodate at least part of the pressure relief member 232 so as to restrict the movement of the pressure relief member 232 along the predetermined direction X. This means that the first restraint slot 2361 is configured to restrict the movement of the pressure relief member 232 within a range along the predetermined direction X. To be specific, while ensuring that the pressure relief member 232 does not detach from the first connecting part 2352 of the restraint member 236 and the connecting member 235, the first restraint slot 2361 allows the pressure relief member 232 to move within a certain range in the predetermined direction X. For example, when the pressure relief member 232 arches due to the effect of the gas inside the battery cell 20, the edge of the pressure relief member 232 will move along the predetermined direction X. In this case, the first restraint slot 2361 of the restraint member 236 can restrict the movement of the pressure relief member 232 within a certain range, to ensure that the pressure relief member 232 does not detach from between the restraint member 236 and the first connecting part 2352 of the connecting member 235, thereby effectively reducing the risk of gaps between the restraint member 236 and the connecting member 235.

The first restraint slot 2361 is provided on the side of the restraint member 236 facing the pressure relief member 232, so that the first restraint slot 2361 can accommodate a portion of the pressure relief member 232. In this way, when the gas inside the battery cell 20 arches the pressure relief member 232, the pressure relief member 232 can be effectively restricted from moving in the predetermined direction X, thereby reducing the occurrence of large gaps between the pressure relief member 232 and the connecting member 235 caused by misplacement. This helps improve the installation stability of the pressure relief member 232, and also reduces the leakage of gas inside the battery cell 20.

In some embodiments, in FIG. 11, the pressure relief member 232 includes a pressure relief part 2322 and a fastening part 2323. The pressure relief part 2322 is provided with an indentation groove 2321, and the pressure relief part 2322 is configured to crack along the indentation groove 2321 to release internal pressure of the battery cell 20 when internal pressure or temperature of the battery cell 20 reaches the threshold. The fastening part 2323 is located on the outer peripheral side of the pressure relief part 2322 in the predetermined direction X, and at least part of the fastening part 2323 is accommodated in the first restraint slot 2361. In the thickness direction of the end cover 231, an outer surface of the fastening part 2323 is closer to the outside of the battery cell 20 than an outer surface of the pressure relief part 2322, and a stepped surface 2324 is formed between the outer surface of the fastening part 2323 and the outer surface of the pressure relief part 2322.

The stepped surface 2324 is formed between the outer surface of the fastening part 2323 and the outer surface of the pressure relief part 2322. That is, in the thickness direction of the end cover 231, a side of the fastening part 2323 facing away from the seal 237 protrudes from one side of the pressure relief part 2322, so that the fastening part 2323 and the pressure relief part 2322 form a stepped structure, thereby forming the stepped surface 2324.

The pressure relief member 232 includes two parts: the pressure relief part 2322 and the fastening part 2323. The indentation groove 2321 is provided on the pressure relief part 2322 to allow the pressure relief part 2322 to relieve pressure when internal pressure or temperature of the battery cell 20 reaches the threshold. The fastening part 2323 is provided on the outer peripheral side of the pressure relief part 2322, and the outer surface of the fastening part 2323 is further away from the interior of the battery cell 20 than the outer surface of the pressure relief part 2322, such that the stepped surface 2324 is formed between the fastening part 2323 and the pressure relief part 2322. When at least part of the fastening part 2323 is accommodated in the first restraint slot 2361 of the restraint member 236, the stepped surface 2324 between the fastening part 2323 and the pressure relief part 2322 allows the side wall of the first restraint slot 2361 to abut against. Such structure is simple and stable, and allows the first restraint slot 2361 to restrict the pressure relief member 232.

According to some embodiments of this application, referring to FIGS. 7, 8 and 9, the restraint member 236 includes a body part 2362, a first restraint part 2363, and a second restraint part 2364. The body part 2362 is attached to the connecting member 235. In the thickness direction of the end cover 231, the body part 2362 is configured to abut against the fastening part 2323. The first restraint part 2363 and the second restraint part 2364 are convexly provided on a side of the body part 2362 facing the pressure relief member 232. Both the first restraint part 2363 and the second restraint part 2364 are annular structures extending in the circumferential direction of the pressure relief hole 2351. The second restraint part 2364 is located on an inner side of the first restraint part 2363. The second restraint part 2364, the body part 2362, and the first restraint part 2363 together define the first restraint slot 2361. The end cover assembly 23 further includes an insulating member 238. In the thickness direction of the end cover 231, at least part of the insulating member 238 is located between the fastening part 2323 and the body part 2362, so as to insulate the pressure relief member 232 from the restraint member 236.

The restraint member 236 includes the body part 2362, the first restraint part 2363, and the second restraint part 2364. The body part 2362 is configured to press against the fastening part 2323 of the pressure relief member 232 so that the body part 2362 can clamp the pressure relief member 232 in cooperation with the connecting member 235. The first restraint part 2363 and the second restraint part 2364 are both convexly disposed on the side of the body part 2362 facing the pressure relief member 232, and the second restraint part 2364 is disposed on the inner side of the first restraint part 2363, so that the second restraint part 2364 and the first restraint part 2363 are spaced apart in the predetermined direction X. In this way, the second restraint part 2364, the body part 2362, and the first restraint part 2363 together define the first restraint slot 2361 for accommodating the fastening part 2323 of the pressure relief member 232.

The insulating member 238 is provided between the fastening part 2323 and the body part 2362 to insulate the pressure relief member 232 from the restraint member 236. In other words, the insulating member 238 enables electrical insulation between the pressure relief member 232 and the restraint member 236, to reduce electrical conduction between the pressure relief member 232 and the restraint member 236, thus reducing safety hazards in the battery cell 20 having such end cover assembly 23.

According to some embodiments of this application, refer to FIGS. 7, 8 and 9. The insulating member 238 includes a first insulator 2381, the first insulator 2381 including a first insulating part 2381*b*, a second insulating part 2381*c*, and a third insulating part 2381*d*. The second insulating part 2381*c* is accommodated in the first restraint slot 2361. In the thickness direction of the end cover 231, both the first insulating part 2381*b* and the third insulating part 2381*d* are convexly provided on a side of the second insulating part 2381*c* facing the pressure relief member 232. Both the first insulating part 2381*b* and the third insulating part 2381*d* are annular structures extending along the circumferential direction of the pressure relief hole 2351, and the third insulating part 2381*d* is located on an inner side of the first insulating part 2381*b*. The first insulating part 2381*b*, the second insulating part 2381*c*, and the third insulating part 2381*d* together define a second restraint slot 2381*a*, the second restraint slot 2381*a* being configured to accommodate a portion of the fastening part 2323 to restrict the movement of the pressure relief member 232 in the predetermined direction X. At least part of the first insulating part 2381*b* is located between an inner peripheral surface of the first restraint part 2363 and an outer peripheral surface of the pressure relief member 232, and/or at least part of the third insulating part 2381*d* is located between an outer peripheral surface of the second restraint part 2364 and the stepped surface 2324.

In the thickness direction of the end cover 231, both the first insulating part 2381*b* and the third insulating part 2381*d* are convexly provided on the side of the second insulating part 2381*c* facing the pressure relief member 232. The first insulating part 2381*b* is at least partially located between the inner peripheral surface of the first restraint part 2363 and the outer peripheral surface of the pressure relief member 232. That is, the first insulating part 2381*b* extends along the thickness direction of the end cover 231 to between the outer peripheral surface of the pressure relief member 232 and the inner peripheral surface of the first restraint part 2363 to separate the outer peripheral surface of the pressure relief member 232 from the inner peripheral surface of the first restraint part 2363. At least part of the third insulating part 2381*d* is located between the outer peripheral surface of the second restraint part 2364 and the stepped surface 2324. That is, the third insulating part 2381*d* extends along the thickness direction of the end cover 231 to between the outer peripheral surface of the second restraint part 2364 and the stepped surface 2324 of the pressure relief member 232 to separate the outer peripheral surface of the second restraint part 2364 from the stepped surface 2324 of the pressure relief member 232.

The second insulating part 2381*c* is accommodated in the first restraint slot 2361 of the restraint member 236 and the first insulating part 2381*b* and the third insulating part 2381*d* are convexly disposed on the side of the second insulating part 2381*c* facing the pressure relief member 232, so that the first insulating part 2381*b*, the second insulating part 2381*c*, and the third insulating part 2381*d* define the second restraint slot 2381*a* for accommodating the fastening part 2323 of the pressure relief member 232. In this way, while the restraint member 236 restricts the movement of the insulating member 238 along the predetermined direction X, the restraint member 236 can indirectly restrict the movement of the pressure relief member 232 along the predetermined direction X through the insulating member 238. Additionally, the restraint member 236 and the pressure relief member 232 can be effectively insulated from each other. In addition, at least part of the first insulating part 2381*b* is disposed between the inner peripheral surface of the first restraint part 2363 and the outer peripheral surface of the pressure relief member 232, so that the first restraint part 2363 can be insulated from the pressure relief member 232. Similarly, at least part of the third insulating part 2381*d* is disposed between the outer peripheral surface of the second restraint part 2364 and the stepped surface 2324 of the pressure relief member 232, so that the second restraint part 2364 can be insulated from the pressure relief member 232.

According to some embodiments of this application, still refer to FIGS. 7, 8 and 9. The insulating member 238 further includes a second insulator 2382 attached to the third insulating part 2381*d*, the second insulator 2382 being convexly provided on an inner peripheral surface of the third insulating part 2381*d* and located between the second restraint part 2364 and the pressure relief part 2322 in the thickness direction of the end cover 231.

The second insulator 2382 is convexly provided on the inner peripheral surface of the third insulating part 2381*d*, meaning that the second insulator 2382 is an annular structure connected to the inner peripheral surface of the third insulating part 2381*d* and extending along the circumferential direction of the pressure relief hole 2351.

The insulating member 238 is further provided with the second insulator 2382 attached to the third insulating part 2381*d*. The second insulator 2382 is convexly provided on the inner peripheral surface of the third insulating part 2381*d*, and is disposed between the second restraint part 2364 of the restraint member 236 and the pressure relief part 2322 of the pressure relief member 232 in the thickness direction of the end cover 231, to separate the pressure relief part 2322 of the pressure relief member 232 from the second restraint part 2364 of the restraint member 236. This allows the insulating member 238 to better insulate the pressure relief member 232 from the restraint member 236.

According to some embodiments of this application, this application further provides a battery cell 20 including an electrode assembly 21, a housing 22, and the end cover assembly 23 according to any one of the above solutions. The housing 22 has an opening, and the housing 22 is configured to accommodate the electrode assembly 21. The end cover 231 of the end cover assembly 23 is configured to cover the opening.

According to some embodiments of this application, the housing 22 and the end cover 231 are made of a same material, and the housing 22 is welded to the end cover 231.

For example, both the housing 22 and the end cover 231 are made of steel.

It should be noted that in other embodiments, the housing 22 may alternatively be attached to the end cover 231 by screwing, snap-fitting, bonding, or other means.

The battery cell 20 employing this structure allows the housing 22 and the end cover 231 to be welded together, thus providing a strong connection between the housing 22 and the end cover assembly 23. In addition, since the housing 22 and the end cover 231 are made of the same material, the hardness of the housing 22 is higher than the hardness of the pressure relief member 232, which helps improve the shock resistance of the housing 22. In this way, when internal pressure of the battery cell 20 increases, the gas inside the battery cell 20 will first impact the pressure relief member 232 with smaller hardness to achieve stable pressure relief, thereby reducing the safety hazards of the battery cell 20. In addition, the housing 22 made of this material can withstand high temperature in the case of thermal runaway inside the battery cell 20, so as to reduce the occurrence of premature melting of the housing 22 before the pressure relief member 232 relieves the pressure. This helps reduce the risk of fire and explosion of the battery cell 20.

According to some embodiments of this application, this application further provides a battery 100 including a box 10 and the battery cell 20 in any one of the foregoing solutions. The box 10 is configured to accommodate the battery cell 20.

According to some embodiments of this application, this application further provides an electric apparatus including the battery 100 in any one of the foregoing solutions. The battery 100 is configured to supply electric energy to the electric apparatus.

The electric apparatus may be any one of the foregoing devices or systems that use the battery 100.

According to some embodiments of this application, refer to FIGS. 4 to 11. This application provides an end cover assembly 23 including an end cover 231, a pressure relief member 232, a connecting member 235, a restraint member 236, a seal 237, and an insulating member 238. The end cover 231 is configured to cover an opening in the housing 22 of the battery cell 20, and the end cover 231 is provided with a positioning hole 2311 running through its inner and outer surfaces. The pressure relief member 232 includes a pressure relief part 2322 and a fastening part 2323 extending in a circumferential direction of the pressure relief part 2322, and the fastening part 2323 is attached to an outer peripheral side of the pressure relief part 2322 and protrudes from an outer surface of the pressure relief part 2322 along a thickness direction of the end cover 231. The pressure relief part 2322 is provided with an indentation groove 2321, and the pressure relief part 2322 is configured to crack along the indentation groove 2321 to release internal pressure of the battery cell 20 when internal pressure or temperature of the battery cell 20 reaches a threshold. A portion of the connecting member 235 is inserted into the positioning hole 2311 and attached to the end cover 231. The connecting member 235 is provided with a pressure relief hole 2351, where the pressure relief hole 2351 communicates with the positioning hole 2311, and the pressure relief member 232 covers the pressure relief hole 2351. The restraint member 236 is attached to the connecting member 235 and is configured to clamp the fastening part 2323 of the pressure relief member 232 in cooperation with the connecting member 235, so as to mount the pressure relief member 232 to the end cover 231. In the thickness direction of the end cover 231, the seal 237 is provided between the connecting member 235 and the pressure relief member 232, to seal a gap between the connecting member 235 and the pressure relief member 232. The insulating member 238 is provided on a side of the pressure relief member 232 facing away from the seal 237, and at least part of the insulating member is located between the restraint member 236 and the pressure relief member 232. The restraint member 236 is provided with a first restraint slot 2361 on a side facing the pressure relief member 232, for accommodating a portion of the insulating member 238. The insulating member 238 is provided with a second restraint slot 2381*a* on a side facing the pressure relief member 232, for accommodating the fastening part 2323 of the pressure relief member 232, so as to insulate the pressure relief member 232 from the restraint member 236. The end cover 231, the connecting member 235, and the restraint member 236 are all made of steel, and the pressure relief member 232 is made of aluminum.

Figure 14:
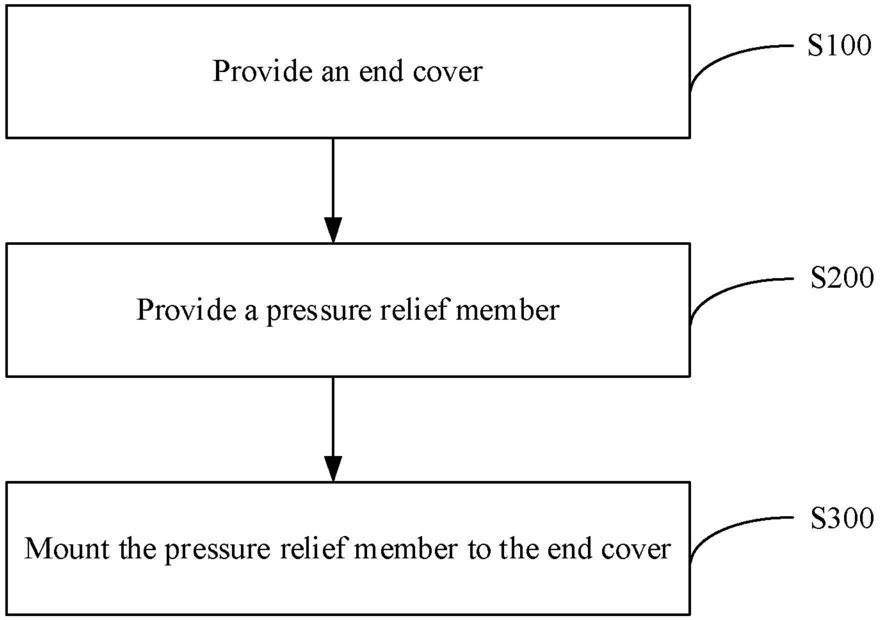
FIG. 14 is a schematic flowchart of a manufacturing method of end cover assembly according to some embodiments of this application.

An embodiment of this application further provides a manufacturing method of the end cover assembly 23. Referring to FIG. 14, FIG. 14 is a schematic flowchart of a manufacturing method of the end cover assembly 23 provided in some embodiments of this application. The manufacturing method includes the following steps.

S100: Provide an end cover 231.

S200: Provide a pressure relief member 232, where the pressure relief member 232 is provided with an indentation groove 2321, and the pressure relief member 232 is configured to crack along the indentation groove 2321 to release internal pressure of a battery cell 20 when internal pressure or temperature of the battery cell 20 reaches a threshold.

S300: Mount the pressure relief member 232 to the end cover 231.

Hardness of the pressure relief member 232 is lower than hardness of the end cover 231.

The order of steps S100 and S200 is not limited in the foregoing method. Step S100 may be performed before step S200, or step S200 may be performed before step S100.

It should be noted that for the structure of the end cover assembly 23 manufactured using the manufacturing method provided in the foregoing embodiments, reference may be made to the end cover assembly 23 provided in the foregoing embodiments, and details are not repeated herein again.

Figure 15:
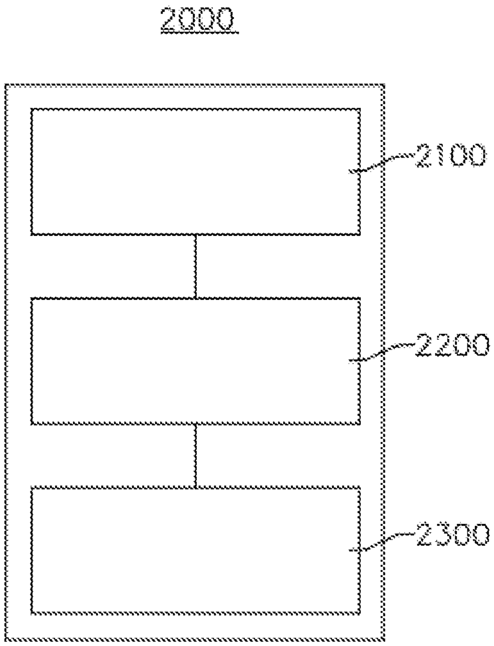
FIG. 15 is a schematic block diagram of a manufacturing device of end cover assembly according to some embodiments of this application.

An embodiment of this application further provides a manufacturing device 2000 for the end cover assembly 23. Referring to FIG. 15, FIG. 15 is a schematic block diagram of a manufacturing device 2000 for the end cover assembly 23 provided in some embodiments of this application. The manufacturing device 2000 includes a first providing means 2100, a second providing means 2200, and an assembly means 2300.

The first providing means 2100 is configured to provide an end cover 231. The second providing means 2200 is configured to provide a pressure relief member 232, where the pressure relief member 232 is provided with an indentation groove 2321, and the pressure relief member 232 is configured to crack along the indentation groove 2321 to release internal pressure of a battery cell 20 when internal pressure or temperature of the battery cell 20 reaches a threshold. The assembly means 2300 is configured to mount the pressure relief member 232 to the end cover 231. Hardness of the pressure relief member 232 is lower than hardness of the end cover 231.

It should be noted that for the structure of the end cover assembly 23 manufactured using the manufacturing device 2000 provided in the foregoing embodiment, reference may be made to the end cover assembly 23 provided in the foregoing embodiments, and details are not repeated herein again.

It should be noted that, in absence of conflict, the embodiments and features in the embodiments in this application may be combined with each other.

The foregoing descriptions are merely some embodiments of this application which are not intended to limit this application. Persons skilled in the art understand that this application may have various modifications and variations. Any modifications, equivalent replacements, and improvements made without departing from the spirit and principle of this application shall fall within the protection scope of this application.

What is claimed is:

1. An end cover assembly for a battery cell, comprising:
- an end cover;
- a pressure relief member, wherein the pressure relief member is provided in the end cover, the pressure relief member is provided with an indentation groove, and the pressure relief member is configured to crack along the indentation groove to release internal pressure of the battery cell in response to the internal pressure or a temperature of the battery cell reaching a threshold;
- a connecting member, wherein the connecting member is attached to the end cover, the connecting member is provided with a pressure relief hole, the pressure relief hole is configured to communicate with interior of the battery cell, and the pressure relief member covers the pressure relief hole; and
- a restraint member, wherein the restraint member is attached to the connecting member, and in a thickness direction of the end cover, the restraint member and the connecting member are configured to clamp a portion of the pressure relief member;
- wherein hardness of the pressure relief member is lower than hardness of the end cover.

2. The end cover assembly according to claim 1, wherein a melting point of the pressure relief member is lower than a melting point of the end cover.

3. The end cover assembly according to claim 1, wherein the melting point of the end cover is higher than 1,000 degrees Celsius.

4. The end cover assembly according to claim 1, wherein a material of the end cover comprises steel.

5. The end cover assembly according to claim 1, wherein a material of the pressure relief member comprises aluminum.

6. The end cover assembly according to claim 1, wherein:
- the connecting member comprises:
  - a first connecting part, wherein the first connecting part is attached to the end cover, and the pressure relief hole is provided in the first connecting part; and
  - a second connecting part, wherein the second connecting part is provided around an edge of the first connecting part; and
- the restraint member and the pressure relief member are both located on an inner peripheral side of the second connecting part, the restraint member is attached to the second connecting part, and in the thickness direction of the end cover, the restraint member and the first connecting part are configured to clamp a portion of the pressure relief member.

7. The end cover assembly according to claim 6, wherein:
- the end cover is provided with a positioning hole running through inner and outer surfaces of the end cover; and
- at least part of the first connecting part is inserted in the positioning hole.

8. The end cover assembly according to claim 1, wherein the restraint member is an annular structure extending in a circumferential direction of the pressure relief member.

9. The end cover assembly according to claim 1, wherein the restraint member is provided on an outer peripheral side of the indentation groove.

10. The end cover assembly according to claim 1, wherein the connecting member is made of a same material as the end cover, and the connecting member is welded to the end cover.

11. The end cover assembly according to claim 1, wherein the restraint member is made of a same material as the connecting member, and the restraint member is welded to the connecting member.

12. The end cover assembly according to claim 1, further comprising:
- a seal;
- wherein at least part of the seal is disposed between the connecting member and the pressure relief member in the thickness direction of the end cover, and the seal is configured to seal the connecting member and the pressure relief member.

13. The end cover assembly according to claim 12, wherein:
- in the thickness direction of the end cover, the connecting member has an abutting surface for the seal to abut against; and
- the abutting surface is provided with a restraint projection, wherein the restraint projection has an annular structure extending in a circumferential direction of the pressure relief hole, and the seal fits around an outer peripheral surface of the restraint projection.

14. The end cover assembly according to claim 1, further comprising:
- an insulating member;
- wherein in the thickness direction of the end cover, at least part of the insulating member is located between the pressure relief member and the restraint member to insulate the pressure relief member from the restraint member.

15. The end cover assembly according to claim 14, wherein:
- the insulating member comprises a first insulator; and
- in the thickness direction of the end cover, the restraint member is provided with a first restraint slot on a side facing the pressure relief member, and the first restraint slot is configured to accommodate at least part of the first insulator to restrict movement of the insulating member in a predetermined direction, the predetermined direction being perpendicular to the thickness direction of the end cover.

16. The end cover assembly according to claim 15, wherein in the thickness direction of the end cover, the first insulator is provided with a second restraint slot on a side facing the pressure relief member, and the second restraint slot is configured to accommodate part of the pressure relief member to restrict movement of the pressure relief member in the predetermined direction.

17. The end cover assembly according to claim 15, wherein:

the insulating member further comprises a second insulator; and the second insulator is convexly disposed on an inner peripheral surface of the first insulator and is located between the restraint member and the pressure relief member in the thickness direction of the end cover.

18. The end cover assembly according to claim 1, wherein in the thickness direction of the end cover, the restraint member is provided with a first restraint slot on a side facing the pressure relief member, and the first restraint slot is configured to accommodate part of the pressure relief member to restrict movement of the pressure relief member in a predetermined direction, the predetermined direction being perpendicular to the thickness direction of the end cover.

19. The end cover assembly according to claim 18, wherein:

the pressure relief member comprises a pressure relief part and a fastening part;

the pressure relief part is provided with the indentation groove, and the pressure relief part is configured to crack along the indentation groove to release internal pressure of the battery cell in response to the internal pressure or the temperature of the battery cell reaching the threshold;

the fastening part is located on an outer peripheral side of the pressure relief part in the predetermined direction, and at least part of the fastening part is accommodated in the first restraint slot; and in the thickness direction of the end cover, an outer surface of the fastening part is closer to outside of the battery cell than an outer surface of the pressure relief part, and a stepped surface is formed between the outer surface of the fastening part and the outer surface of the pressure relief part.

* * * * *